United States Patent
Kostka et al.

(10) Patent No.: US 11,218,492 B2
(45) Date of Patent: *Jan. 4, 2022

(54) SYSTEM AND METHOD FOR VERIFYING DEVICE SECURITY

(71) Applicant: Estimote Polska Sp. z o. o., Cracow (PL)

(72) Inventors: Lukasz Kostka, Cracow (PL); Jakub Krzych, Cracow (PL)

(73) Assignee: ESTIMOTE POLSKA SP. Z .O.O., Cracow (PL)

( * ) Notice: Subject to any disclaimer, the term of this patent is extended or adjusted under 35 U.S.C. 154(b) by 260 days.

This patent is subject to a terminal disclaimer.

(21) Appl. No.: 16/690,864

(22) Filed: Nov. 21, 2019

(65) Prior Publication Data

US 2021/0120009 A1 Apr. 22, 2021

Related U.S. Application Data

(63) Continuation of application No. 16/549,988, filed on Aug. 23, 2019, now Pat. No. 10,523,685.

(60) Provisional application No. 62/721,364, filed on Aug. 22, 2018.

(51) Int. Cl.
*H04L 29/06* (2006.01)
*H04W 12/08* (2021.01)
*H04L 29/08* (2006.01)

(52) U.S. Cl.
CPC ........ *H04L 63/107* (2013.01); *H04L 63/0428* (2013.01); *H04L 63/108* (2013.01); *H04L 67/20* (2013.01)

(58) Field of Classification Search
None
See application file for complete search history.

(56) References Cited

U.S. PATENT DOCUMENTS

| | | |
|---|---|---|
| 6,091,358 A | 7/2000 | Maniscalco et al. |
| 6,362,778 B2 | 3/2002 | Neher |
| 6,775,258 B1 | 8/2004 | Van et al. |
| 6,873,258 B2 | 3/2005 | Marples et al. |
| RE38,899 E | 11/2005 | Fischer |
| 6,965,575 B2 | 11/2005 | Srikrishna et al. |
| 7,027,808 B2 | 4/2006 | Wesby |
| 7,038,584 B2 | 5/2006 | Carter |
| 7,072,671 B2 | 7/2006 | Leitch |
| 7,146,178 B2 | 12/2006 | Lehikoinen et al. |
| 7,283,846 B2 | 10/2007 | Spriestersbach et al. |

(Continued)

FOREIGN PATENT DOCUMENTS

| AU | 2016101053 A4 | 8/2016 |
|---|---|---|
| CN | 101494599 A | 7/2009 |

(Continued)

OTHER PUBLICATIONS

U.S. Appl. No. 16/375,836.

(Continued)

*Primary Examiner* — Fatoumata Traore
(74) *Attorney, Agent, or Firm* — Jeffrey Schox; Diana Lin

(57) ABSTRACT

A method for verifying a proximity of a user device to a beacon, including broadcasting a frame comprising an encrypted payload, receiving the frame, extracting information from the frame, and verifying the proximity of the user device to the beacon based on the extracted information.

20 Claims, 9 Drawing Sheets

(56) References Cited

U.S. PATENT DOCUMENTS

| | | |
|---|---|---|
| 7,312,752 B2 | 12/2007 | Smith et al. |
| 7,366,113 B1 | 4/2008 | Chandra et al. |
| 7,458,825 B2 | 12/2008 | Atsmon et al. |
| 7,499,462 B2 | 3/2009 | MacMullan et al. |
| 7,564,812 B1 * | 7/2009 | Elliott .................. H04W 48/08 370/329 |
| 7,639,131 B2 | 12/2009 | Mock et al. |
| 7,683,761 B2 | 3/2010 | Burghard et al. |
| 7,705,728 B2 | 4/2010 | Mock et al. |
| 7,706,282 B2 | 4/2010 | Huang |
| 7,835,505 B2 | 11/2010 | Toyama et al. |
| 7,855,679 B1 | 12/2010 | Braiman |
| 7,865,306 B2 | 1/2011 | Mays |
| 7,983,677 B2 | 7/2011 | Dacosta |
| 8,058,988 B1 | 11/2011 | Medina et al. |
| 8,139,945 B1 | 3/2012 | Amir et al. |
| 8,160,056 B2 | 4/2012 | Van et al. |
| 8,260,320 B2 | 9/2012 | Herz |
| 8,265,621 B2 | 9/2012 | Kopikare et al. |
| 8,407,417 B2 | 3/2013 | Matsuda et al. |
| 8,489,112 B2 | 7/2013 | Roeding et al. |
| 8,520,648 B2 | 8/2013 | Cordeiro |
| 8,559,975 B2 | 10/2013 | Basu et al. |
| 8,566,839 B2 | 10/2013 | Johnson et al. |
| 8,594,850 B1 | 11/2013 | Gourlay et al. |
| 8,600,341 B2 | 12/2013 | Johnson |
| 8,612,604 B2 | 12/2013 | Beatty et al. |
| 8,634,796 B2 | 1/2014 | Johnson |
| 8,639,267 B2 | 1/2014 | Johnson |
| 8,644,255 B1 | 2/2014 | Burcham et al. |
| 8,694,060 B2 | 4/2014 | Vanderaa et al. |
| 8,694,782 B2 | 4/2014 | Lambert |
| 8,718,598 B2 | 5/2014 | Johnson |
| 8,723,720 B2 | 5/2014 | Moffatt et al. |
| 8,750,823 B2 | 6/2014 | Johnson |
| 8,750,841 B2 | 6/2014 | Johnson et al. |
| 8,761,751 B2 | 6/2014 | Johnson et al. |
| 8,761,804 B2 | 6/2014 | Johnson |
| 8,781,502 B1 | 7/2014 | Middleton et al. |
| 8,791,901 B2 | 7/2014 | Mallinson |
| 8,797,144 B2 | 8/2014 | Hinman et al. |
| 8,797,214 B2 | 8/2014 | Taylor et al. |
| 8,844,007 B2 | 9/2014 | Vicente et al. |
| 8,847,754 B2 | 9/2014 | Buchheim et al. |
| 8,855,922 B1 | 10/2014 | Starenky et al. |
| 8,867,993 B1 | 10/2014 | Perkins et al. |
| 8,868,133 B1 | 10/2014 | Rosenbaum et al. |
| 8,886,226 B2 | 11/2014 | Johnson |
| 8,886,230 B2 | 11/2014 | Sydir et al. |
| 8,887,177 B2 | 11/2014 | Johnson et al. |
| 8,896,485 B2 | 11/2014 | Mendelson |
| 8,897,741 B2 | 11/2014 | Johnson |
| 8,897,742 B2 | 11/2014 | Johnson |
| 8,911,932 B2 | 12/2014 | Sun |
| 8,923,806 B2 | 12/2014 | Johnson |
| 8,934,389 B2 | 1/2015 | Kuehnel et al. |
| 8,938,196 B2 | 1/2015 | Bradish et al. |
| 8,942,693 B2 | 1/2015 | Johnson |
| 8,942,732 B2 | 1/2015 | Johnson |
| 8,942,733 B2 | 1/2015 | Johnson |
| 8,971,850 B2 | 3/2015 | Klein et al. |
| 8,971,932 B2 | 3/2015 | Mapes |
| 8,988,221 B2 | 3/2015 | Raji et al. |
| 8,996,030 B2 | 3/2015 | Grainger et al. |
| 8,997,243 B2 | 3/2015 | Epstein |
| 9,000,892 B2 | 4/2015 | Hinman et al. |
| 9,014,658 B2 | 4/2015 | Johnson |
| 9,014,715 B2 | 4/2015 | Alizadeh-Shabdiz et al. |
| 9,026,134 B2 | 5/2015 | Edge |
| 9,033,255 B2 | 5/2015 | Tessier et al. |
| 9,036,792 B2 | 5/2015 | Cacioppo et al. |
| 9,055,406 B2 | 6/2015 | Johnson |
| 9,063,212 B2 | 6/2015 | Jones |
| 9,078,095 B2 | 7/2015 | Johnson |
| 9,088,868 B2 | 7/2015 | Johnson |
| 9,088,869 B2 | 7/2015 | Johnson |
| 9,100,792 B2 | 8/2015 | Johnson |
| 9,113,295 B2 | 8/2015 | Johnson |
| 9,113,309 B2 | 8/2015 | Uilecan et al. |
| 9,113,343 B2 | 8/2015 | Moshfeghi |
| 9,140,796 B2 | 9/2015 | Zhou |
| 9,143,890 B2 | 9/2015 | Jose et al. |
| 9,154,565 B2 | 10/2015 | Monighetti |
| 9,202,245 B2 | 12/2015 | Kostka et al. |
| 9,204,275 B2 | 12/2015 | Johnson et al. |
| 9,237,506 B2 | 1/2016 | Brown et al. |
| 9,253,597 B2 | 2/2016 | Johnson |
| 9,258,674 B2 | 2/2016 | Chen |
| 9,282,436 B2 | 3/2016 | Chitre et al. |
| 9,282,582 B1 | 3/2016 | Dunsbergen et al. |
| 9,307,355 B2 | 4/2016 | Nehrenz et al. |
| 9,325,723 B2 | 4/2016 | Son et al. |
| 9,351,114 B2 | 5/2016 | Chatterjee et al. |
| 9,361,630 B1 | 6/2016 | Goswami |
| 9,392,408 B2 | 7/2016 | Johnson |
| 9,398,422 B2 | 7/2016 | Zampini |
| 9,408,060 B2 | 8/2016 | Helms et al. |
| 9,424,699 B2 | 8/2016 | Kusens et al. |
| 9,445,238 B2 | 9/2016 | Johnson et al. |
| 9,445,305 B2 | 9/2016 | Lyon et al. |
| 9,456,303 B2 | 9/2016 | Johnson |
| 9,462,469 B2 | 10/2016 | Hillyard |
| 9,471,917 B2 | 10/2016 | Govindarajan et al. |
| 9,474,962 B2 | 10/2016 | Barney et al. |
| 9,491,575 B2 | 11/2016 | Edge et al. |
| 9,544,744 B2 | 1/2017 | Postrel |
| 9,551,774 B2 | 1/2017 | Ishida et al. |
| 9,558,507 B2 | 1/2017 | Zilkha |
| 9,571,957 B2 | 2/2017 | Granbery |
| 9,571,985 B2 | 2/2017 | Bottazzi et al. |
| 9,584,993 B2 | 2/2017 | Johnson et al. |
| 9,591,570 B2 | 3/2017 | Kubo et al. |
| 9,608,999 B2 * | 3/2017 | Somani .................. H04W 4/029 |
| 9,609,487 B2 | 3/2017 | Alshihi |
| 9,621,446 B2 | 4/2017 | Pugh et al. |
| 9,622,046 B2 | 4/2017 | Otis et al. |
| 9,622,208 B2 | 4/2017 | Mycek et al. |
| 9,629,064 B2 | 4/2017 | Graves et al. |
| 9,634,928 B2 | 4/2017 | Choudhury et al. |
| 9,642,173 B2 | 5/2017 | Granbery |
| 9,648,662 B2 | 5/2017 | Herrala et al. |
| 9,652,124 B2 | 5/2017 | Cotier et al. |
| 9,684,826 B2 | 6/2017 | Dubuque |
| 9,684,925 B2 | 6/2017 | Khalid et al. |
| 9,689,955 B2 | 6/2017 | Rosenbaum |
| 9,712,967 B2 | 7/2017 | Kostka et al. |
| 9,801,062 B2 | 10/2017 | Niewczas et al. |
| 9,826,356 B2 | 11/2017 | Mycek et al. |
| 9,832,194 B2 | 11/2017 | Krieger et al. |
| 9,866,996 B1 | 1/2018 | Krzych et al. |
| 9,867,009 B2 | 1/2018 | Mycek et al. |
| 9,886,696 B2 | 2/2018 | Roeding et al. |
| 9,922,294 B2 | 3/2018 | Raina et al. |
| 9,998,867 B2 | 6/2018 | Keithley |
| 10,092,245 B2 | 10/2018 | Leboeuf et al. |
| 10,094,907 B2 | 10/2018 | Niewczas et al. |
| 10,111,034 B2 | 10/2018 | Johnson |
| 10,292,011 B2 | 5/2019 | Johnson |
| 2001/0026240 A1 | 10/2001 | Neher |
| 2002/0167919 A1 | 11/2002 | Marples et al. |
| 2002/0176388 A1 | 11/2002 | Rankin et al. |
| 2003/0084539 A1 | 5/2003 | Wartian |
| 2003/0100315 A1 | 5/2003 | Rankin |
| 2003/0146835 A1 | 8/2003 | Carter |
| 2003/0148775 A1 | 8/2003 | Spriestersbach et al. |
| 2004/0008663 A1 | 1/2004 | Srikrishna et al. |
| 2004/0190447 A1 | 9/2004 | Dacosta |
| 2004/0264372 A1 | 12/2004 | Huang |
| 2004/0264466 A1 | 12/2004 | Huang |
| 2005/0124380 A1 | 6/2005 | Rokusek et al. |
| 2005/0162271 A1 | 7/2005 | Leitch |
| 2005/0201301 A1 | 9/2005 | Bridgelall |
| 2005/0222933 A1 | 10/2005 | Wesby |
| 2006/0163349 A1 | 7/2006 | Neugebauer |

(56) References Cited

U.S. PATENT DOCUMENTS

| | | |
|---|---|---|
| 2006/0164213 A1 | 7/2006 | Burghard et al. |
| 2006/0185014 A1 | 8/2006 | Spatscheck et al. |
| 2006/0209745 A1 | 9/2006 | MacMullan et al. |
| 2006/0259942 A1 | 11/2006 | Toyama et al. |
| 2006/0290519 A1 | 12/2006 | Boate et al. |
| 2006/0291473 A1 | 12/2006 | Chase et al. |
| 2007/0067104 A1 | 3/2007 | Mays |
| 2007/0069923 A1 | 3/2007 | Mendelson |
| 2007/0123166 A1 | 5/2007 | Sheynman et al. |
| 2007/0243769 A1 | 10/2007 | Atsmon et al. |
| 2007/0247366 A1 | 10/2007 | Smith et al. |
| 2008/0056215 A1 | 3/2008 | Kopikare et al. |
| 2008/0062891 A1 | 3/2008 | Van et al. |
| 2008/0068519 A1 | 3/2008 | Adler et al. |
| 2008/0139306 A1 | 6/2008 | Lutnick et al. |
| 2008/0143516 A1 | 6/2008 | Mock et al. |
| 2008/0143604 A1 | 6/2008 | Mock et al. |
| 2008/0146265 A1 | 6/2008 | Valavi |
| 2008/0146890 A1 | 6/2008 | LeBoeuf et al. |
| 2008/0231460 A1 | 9/2008 | Owen et al. |
| 2009/0005079 A1 | 1/2009 | Shields et al. |
| 2009/0009398 A1 | 1/2009 | Taylor et al. |
| 2009/0036066 A1 | 2/2009 | Chiu et al. |
| 2009/0102296 A1 | 4/2009 | Greene et al. |
| 2009/0131079 A1 | 5/2009 | Sekhar |
| 2009/0311976 A1 | 12/2009 | Vanderaa et al. |
| 2009/0327135 A1 | 12/2009 | Nguyen et al. |
| 2010/0019924 A1 | 1/2010 | D et al. |
| 2010/0093374 A1 | 4/2010 | Dacosta |
| 2010/0099435 A1 | 4/2010 | Druzinic-Fiebach et al. |
| 2010/0100582 A1 | 4/2010 | Beatty et al. |
| 2010/0105353 A1 | 4/2010 | Cacioppo et al. |
| 2010/0120450 A1 | 5/2010 | Herz |
| 2010/0150122 A1 | 6/2010 | Berger et al. |
| 2010/0168924 A1 | 7/2010 | Tessier et al. |
| 2010/0317371 A1 | 12/2010 | Migos et al. |
| 2011/0028160 A1 | 2/2011 | Roeding et al. |
| 2011/0029359 A1 | 2/2011 | Roeding et al. |
| 2011/0085442 A1 | 4/2011 | Lin et al. |
| 2011/0102171 A1 | 5/2011 | Raji et al. |
| 2011/0125063 A1 | 5/2011 | Shalon et al. |
| 2011/0238188 A1 | 9/2011 | Washiro |
| 2011/0305228 A1 | 12/2011 | Cordeiro |
| 2011/0306357 A1 | 12/2011 | Alizadeh-Shabdiz et al. |
| 2012/0032876 A1 | 2/2012 | Tabe |
| 2012/0057456 A1 | 3/2012 | Bogatin et al. |
| 2012/0057518 A1 | 3/2012 | Herrala et al. |
| 2012/0095805 A1 | 4/2012 | Ghosh et al. |
| 2012/0112055 A1 | 5/2012 | Castro-Perez et al. |
| 2012/0172055 A1 | 7/2012 | Edge |
| 2012/0190386 A1 | 7/2012 | Anderson |
| 2012/0258730 A1 | 10/2012 | Tinnakornsrisuphap et al. |
| 2012/0260323 A1 | 10/2012 | San Vicente et al. |
| 2012/0262365 A1 | 10/2012 | Mallinson |
| 2012/0280862 A1 | 11/2012 | Moffatt et al. |
| 2012/0284517 A1 | 11/2012 | Lambert |
| 2012/0295535 A1 | 11/2012 | Bradish et al. |
| 2012/0309256 A1 | 12/2012 | Theodore |
| 2012/0316960 A1 | 12/2012 | Yang |
| 2012/0320815 A1 | 12/2012 | Massena |
| 2012/0331394 A1 | 12/2012 | Trombley-Shapiro et al. |
| 2013/0023282 A1 | 1/2013 | Lin |
| 2013/0030915 A1 | 1/2013 | Statler et al. |
| 2013/0063303 A1 | 3/2013 | Zhou |
| 2013/0065584 A1 | 3/2013 | Lyon et al. |
| 2013/0165157 A1 | 6/2013 | Mapes |
| 2013/0182625 A1 | 7/2013 | Kuehnel et al. |
| 2013/0184002 A1 | 7/2013 | Moshfeghi |
| 2013/0203445 A1 | 8/2013 | Grainger et al. |
| 2013/0225197 A1 | 8/2013 | Mcgregor et al. |
| 2013/0296719 A1 | 11/2013 | Packer et al. |
| 2013/0307972 A1 | 11/2013 | Stone et al. |
| 2013/0312043 A1 | 11/2013 | Stone et al. |
| 2013/0337771 A1 | 12/2013 | Klein et al. |
| 2014/0018002 A1 | 1/2014 | Jose et al. |
| 2014/0087758 A1 | 3/2014 | Maor |
| 2014/0106782 A1 | 4/2014 | Chitre et al. |
| 2014/0122703 A1 | 5/2014 | Pugh et al. |
| 2014/0122855 A1 | 5/2014 | Maneval |
| 2014/0135042 A1 | 5/2014 | Buchheim et al. |
| 2014/0148196 A1 | 5/2014 | Bassan-Eskenazi et al. |
| 2014/0149577 A1 | 5/2014 | Monighetti |
| 2014/0180817 A1 | 6/2014 | Zilkha |
| 2014/0215371 A1 | 7/2014 | Liu |
| 2014/0219118 A1 | 8/2014 | Middleton et al. |
| 2014/0220883 A1 | 8/2014 | Emigh et al. |
| 2014/0228044 A1 | 8/2014 | Jones |
| 2014/0277654 A1 | 9/2014 | Reinhardt et al. |
| 2014/0302869 A1 | 10/2014 | Rosenbaum et al. |
| 2014/0304004 A1 | 10/2014 | Trethewey |
| 2014/0361906 A1 | 12/2014 | Hughes et al. |
| 2015/0005011 A1 | 1/2015 | Nehrenz et al. |
| 2015/0031388 A1 | 1/2015 | Chatterjee et al. |
| 2015/0038171 A1 | 2/2015 | Uilecan et al. |
| 2015/0058355 A1 | 2/2015 | Naqvi |
| 2015/0079942 A1 | 3/2015 | Kostka et al. |
| 2015/0081474 A1 | 3/2015 | Kostka et al. |
| 2015/0094140 A1 | 4/2015 | Barney et al. |
| 2015/0106196 A1 | 4/2015 | Williams et al. |
| 2015/0163828 A1 | 6/2015 | Vandwalle et al. |
| 2015/0245305 A1 | 8/2015 | Camps Mur |
| 2015/0248667 A1 | 9/2015 | Govindarajan et al. |
| 2015/0269624 A1 | 9/2015 | Cheng et al. |
| 2015/0276432 A1 | 10/2015 | Repyevsky et al. |
| 2015/0279115 A1 | 10/2015 | Vukicevic |
| 2015/0289207 A1 | 10/2015 | Kubo et al. |
| 2015/0294398 A1 | 10/2015 | Khalid et al. |
| 2015/0295333 A1 | 10/2015 | Shibuya et al. |
| 2015/0296048 A1 | 10/2015 | Gerding et al. |
| 2015/0296333 A1 | 10/2015 | Chen |
| 2015/0334548 A1 | 11/2015 | Liu et al. |
| 2015/0334678 A1 | 11/2015 | Macgougan et al. |
| 2015/0347959 A1 | 12/2015 | Skaaksrud |
| 2015/0351008 A1 | 12/2015 | Mayor |
| 2015/0355308 A1 | 12/2015 | Ishida et al. |
| 2015/0365790 A1 | 12/2015 | Edge et al. |
| 2015/0373521 A1 | 12/2015 | Olesen et al. |
| 2015/0379576 A1 | 12/2015 | Otis et al. |
| 2015/0382153 A1 | 12/2015 | Otis et al. |
| 2016/0006837 A1 | 1/2016 | Reynolds et al. |
| 2016/0007315 A1 | 1/2016 | Lundgreen et al. |
| 2016/0014609 A1 | 1/2016 | Goel et al. |
| 2016/0021687 A1 | 1/2016 | Granbery |
| 2016/0042767 A1 | 2/2016 | Araya et al. |
| 2016/0049028 A1 | 2/2016 | Kusens et al. |
| 2016/0050219 A1* | 2/2016 | Niewczas ............ H04W 12/10 726/5 |
| 2016/0055428 A1 | 2/2016 | Raina et al. |
| 2016/0063550 A1 | 3/2016 | Caldwell |
| 2016/0086029 A1 | 3/2016 | Dubuque |
| 2016/0086460 A1 | 3/2016 | King et al. |
| 2016/0094398 A1 | 3/2016 | Choudhury et al. |
| 2016/0094598 A1 | 3/2016 | Gedikian |
| 2016/0094946 A1 | 3/2016 | Keithley |
| 2016/0099758 A1 | 4/2016 | Bell et al. |
| 2016/0105788 A1 | 4/2016 | Helms et al. |
| 2016/0123745 A1 | 5/2016 | Cotier et al. |
| 2016/0127875 A1 | 5/2016 | Zampini |
| 2016/0174022 A1 | 6/2016 | Nhu |
| 2016/0182365 A1 | 6/2016 | Chang et al. |
| 2016/0188919 A1 | 6/2016 | Gao et al. |
| 2016/0192407 A1 | 6/2016 | Fyfe et al. |
| 2016/0203522 A1 | 7/2016 | Shiffert et al. |
| 2016/0277999 A1 | 9/2016 | Graves et al. |
| 2016/0291127 A1 | 10/2016 | Huang et al. |
| 2016/0345126 A1 | 11/2016 | Granbery |
| 2017/0005958 A1 | 1/2017 | Frenkel et al. |
| 2017/0019765 A1 | 1/2017 | Hoyer et al. |
| 2017/0064667 A1 | 3/2017 | Mycek et al. |
| 2017/0079001 A1 | 3/2017 | Lewis |
| 2017/0099567 A1 | 4/2017 | Kwon et al. |
| 2017/0171795 A1* | 6/2017 | Wang ............... H04W 48/04 |

(56) References Cited

U.S. PATENT DOCUMENTS

| | | | |
|---|---|---|---|
| 2017/0188191 A1 | 6/2017 | Aldana et al. | |
| 2018/0288563 A1 | 10/2018 | Krzych et al. | |

FOREIGN PATENT DOCUMENTS

| | | | | |
|---|---|---|---|---|
| EP | 2296407 B1 | 9/2014 | | |
| EP | 3047681 A1 | 7/2016 | | |
| KR | 20030084539 A | 11/2003 | | |
| KR | 20040050425 A | 6/2004 | | |
| KR | 101113052 B1 | 2/2012 | | |
| WO | 0221429 A2 | 3/2002 | | |
| WO | 2005006128 A2 | 1/2005 | | |
| WO | 2008135432 A1 | 11/2008 | | |
| WO | 2015026862 A1 | 2/2015 | | |
| WO | 2016025175 A1 | 2/2016 | | |
| WO | WO-2016025175 A1 * | 2/2016 | ........ | H04W 12/0471 |
| WO | 2016043388 A1 | 3/2016 | | |
| WO | WO-2016043388 A1 * | 3/2016 | ............ | H04W 12/12 |
| WO | 2017007719 A1 | 1/2017 | | |
| WO | 2017040690 A1 | 3/2017 | | |
| WO | 2017196883 A1 | 11/2017 | | |

OTHER PUBLICATIONS

"Reality Matters", The Estimote Team Blog, https://blog.estimote.com/post/172115262320/presence-verification-and-security-is-more-refined, Mar. 29, 2018.

Hassidim, Avinatan, et al., "Ephemeral Identifiers: Mitigating Tracking & Spoofing Threats to BLE Beacons", Google Inc., Apr. 14, 2016.

Jung, Changsu, et al., ""Topology Configuration and Multihop Routing Protocol for Bluetooth Low Energy Networks"", IEEE Access, Dec. 13, 2017, 9587-9598.

Jung, Chanhsu, et al., ""Maximum Power Plus RSSI Based Routing Protocol for Bluetooth Low Energy Ad Hoc Networks"", Wireless Communications and Mobile Computing, Dec. 13, 2017, 1-13.

Paterson, Kenneth G., et al., "Time-Specific Encryption", Information Security Group, Royal Holloway, University of London, https://eprint.iacr.org/2010/347.pdf.

International Search Report and Written Opinion of the ISA dated Jan. 22, 2020 for Application No. PCT/IB2019/000828.

Jung Changsu et al: "Topology Configuration and Multihop Routing Protocol for Bluetooth Low Energy Networks", IEEE Access, vol. 5, Dec. 13, 2017 (Dec. 13, 2017), pp. 9587-9598.

* cited by examiner

Absolute Packet Delay  Packet Rate Stability $\Delta_k = (TB_k - TR_k)$  $\delta_k = (TR_{k+1} - TR_k) - (TB_{k+1} - TB_k)$ ers. The system can optionally include one or more clients 700 and/or any suitable components. Variants of the system, as shown for example in FIG. 2, can include one or more: beacons, user devices, remote computing devices, clients, and/or any suitable components.

As shown in FIG. 3, the method S20 can include generating one or more frames, broadcasting one or more frames,
SYSTEM AND METHOD FOR VERIFYING DEVICE SECURITY

CROSS-REFERENCE TO RELATED APPLICATIONS

This application is a continuation of U.S. patent application Ser. No. 16/549,988 filed 23 Aug. 2019 which claims the benefit of U.S. Provisional Application No. 62/721,364, filed 22 Aug. 2018, which are incorporated in their entirety by this reference.

This application is related to U.S. application Ser. No. 15/921,844 filed 15 Mar. 2018 and U.S. application Ser. No. 16/152,254 filed 4 Oct. 2018, each of which is incorporated in its entirety by this reference.

TECHNICAL FIELD

This invention relates generally to the device security field, and more specifically to a new and useful system and method in the device security field.

BACKGROUND

Malicious entities and/or bad actors find it desirable to target secured devices. Therefore, there is a need in the field of device security for an improved system and method. This invention provides such an improved system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
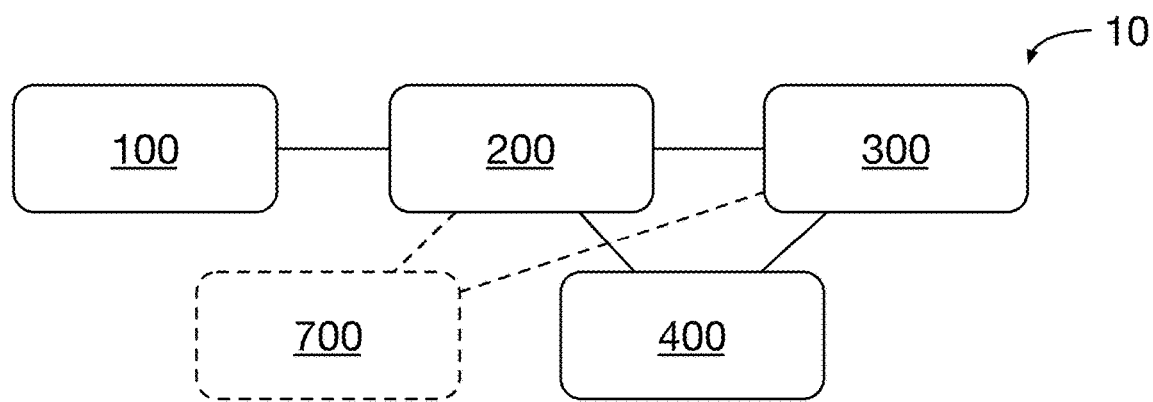
FIG. 1 is a schematic representation of the system.
Figure 2:
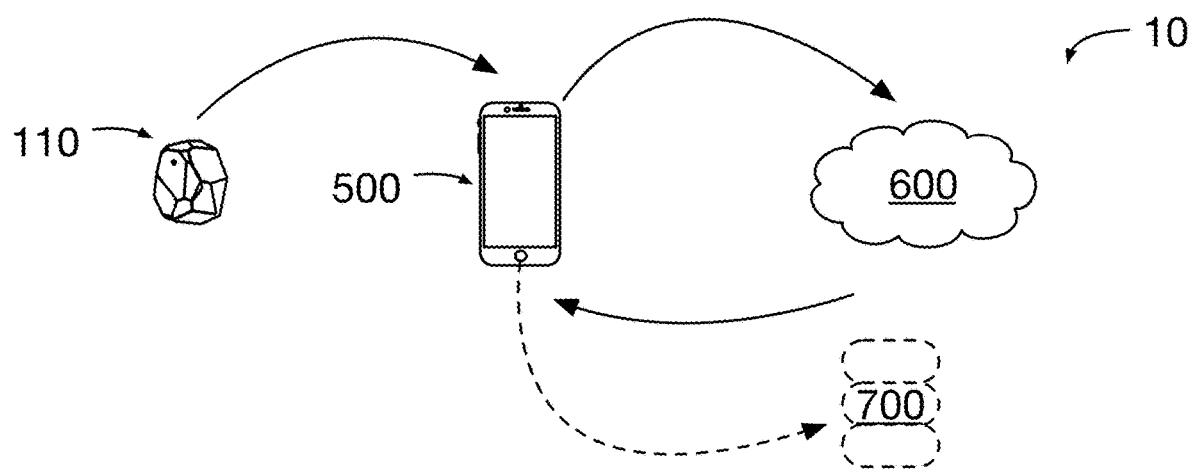
FIG. 2 is a schematic representation of an embodiment of the system.

As shown in FIG. 1, the system 10 can include one or more: secured devices 100, listeners 200, resolvers 300, verifiers 400, and/or any suitable components. The system can optionally include one or more clients 700 and/or any suitable components. Variants of the system, as shown for example in FIG. 2, can include one or more: beacons, user devices, remote computing devices, clients, and/or any suitable components.

Figure 3:
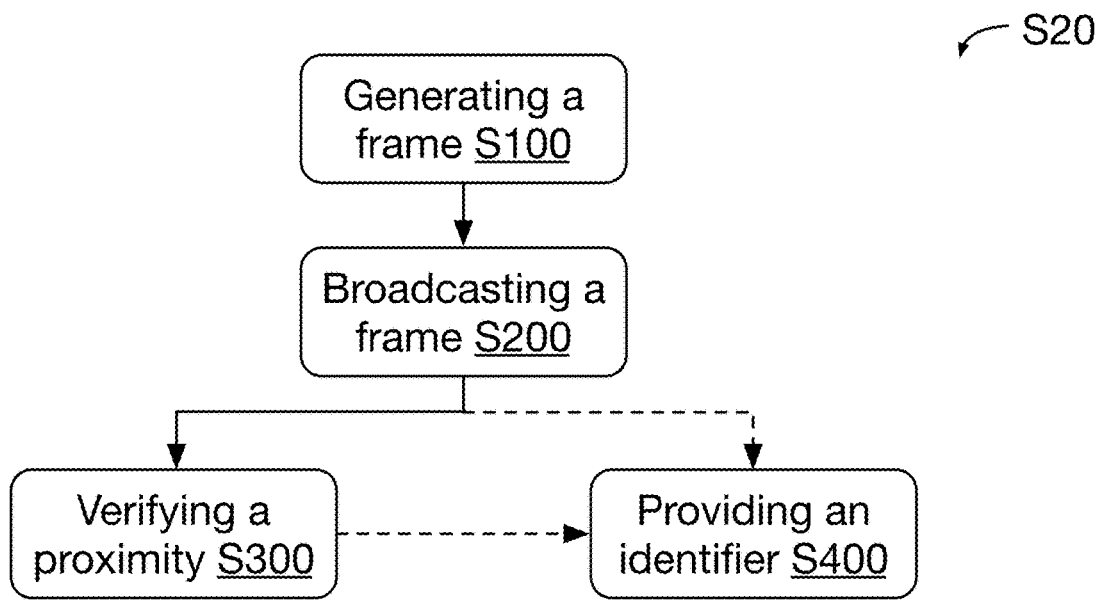
FIG. 3 is a schematic representation of the method.

As shown in FIG. 3, the method S20 can include generating one or more frames, broadcasting one or more frames, verifying proximity, providing a secured device identifier, and/or any suitable steps. The method is preferably performed by the system; however, any suitable system can be used.

In a specific example, when a user attempts to use the secured device (e.g., to access a third-party application, third-party database, client information, etc.), the technology can be used to confirm the proximity of the user to the secured device. If the user is in proximity to the secured device (e.g., within a broadcast receipt range or any other suitable physical distance of the secured device), a user device can be verified and the user device can access the third-party application (e.g., for a given amount of time, as long as the user location does not change significantly, etc.), or the public identifier (e.g., beacon identifier) for the secured device can be provided to the third party application and/or user device. If the user is not determined to be in proximity to the beacon, then the user device is not able to access the third-party application, the public identifier will not be provided to the user device or third-party application, and/or a rejection notification sent to the user device. However, the system and/or method can function in any suitable manner.

2. Benefits.

Variations of the technology can confer several benefits and/or advantages.

First, variants of the technology can confer the benefit of enabling more accurate location determination than other location sensing means. Specific variants can be harder to spoof and/or more accurate than GPS and/or other location sensors. In a specific example, the secure device's temporary identifier can be periodically changed and independently calculated (e.g., deterministically) by both the secure device and the verifier (e.g., based on shared secret information stored by the secure device and the verifier during manufacture).

Second, variants of the technology can confer the benefit of ensuring that the user is located in close proximity to the beacon. In specific variants, the technology can compare broadcast time(s) and receipt time(s) to ensure that the time(s) are within an acceptable error to validate user proximity. In a specific example, the broadcast time(s) are encrypted within the broadcast payload to ensure that malicious actors cannot spoof the broadcast time.

Third, variants of the technology can confer the benefit of preventing malicious attacks. In specific variants, the system and method can function to prevent beacon spoofing and man-in-the-middle (e.g., replay attacks) by validating a user proximity relative to the beacon.

Fourth, variants of the technology can confer the benefit of increased payload security by rotating the encryption key used to encrypt and/or decrypt the payload. In one example, the encryption key is (periodically) independently generated on-board the beacon and by the beacon platform (e.g., verifier). The encryption key is preferably deterministically generated, but can be otherwise generated.

Fifth, variants of the technology can optionally rotate the broadcast beacon identifiers (e.g., temporary identifiers), which can also prevent spoofing. In one example, the temporary identifier is (periodically) independently generated on-board the beacon and by the beacon platform (e.g., holding the beacon registry) based on synchronized data (e.g., synchronized clocks, a shared secret, etc.). The temporary identifier is preferably deterministically generated, but can be otherwise generated.

Sixth, in variants of the technology, each temporary identifier can be associated with a different encryption key, wherein the temporary identifier functions as the shared secret and/or another identifier for indicating which encryption key to use.

Seventh, variants of the technology can optionally enable third-party temporary identifier resolution into a public beacon identifier, without sharing the encryption key for the encrypted payload. For example, the temporary identifier used in the broadcast frame can be clear text, such that a third-party resolver (without the encryption key, but with lookup table associating temporary IDs to public IDs, such as for beacons within the resolver's geographic location) can resolve the temporary ID into the public ID, which can subsequently be used by a client or application to perform a predefined set of actions.

However, variants of the technology can confer any other suitable benefits and/or advantages.

3. System.

The system 10 preferably functions to determine whether a user is in proximity to a secured device. The system 10 can optionally function to enable a user (e.g., via a user device) to perform a predetermined action (e.g., accessing client information, access third party application, etc.). Additionally or alternatively, the system can perform any suitable function.

Hereinafter, all references to and/or processes for a single secured device (e.g., beacon) can be replicated for one or more secured devices. When multiple secured devices are used, each beacon preferably includes a different set of beacon parameters, but can alternatively or additionally share beacon parameters.

The listener can be in proximity with the secured device when: the listener is within a predetermined physical range of the secured device (e.g., within a broadcast range, within a static range, etc.), is collocated with the secured device, and/or is otherwise arranged relative to the secured device.

The components of the system are preferably independently synchronized (e.g., synchronize time) such as by accessing a time server (e.g., NTP time server). However, additionally or alternatively, the components of the system can be initially synchronized (e.g., at the time of manufacture, at the time of deployment, such that the time drift is assumed to be minimal, etc.), synchronize to one component's clock, share a clock, can be configured to correct for timing differences, and/or be otherwise suitably synchronized.

The secured device 100 (e.g., beacon 110) can function to generate and broadcast a series of frames (e.g., a Bluetooth frame). The secured device can additionally or alternatively define a geographic location (e.g., geolocation), can enable interactions with third client information (e.g., third party applications), and/or perform any suitable function.

The beacon 110 is preferably in communication with one or more listeners (e.g., when the listeners are within a communication distance); however, the beacon can be in communication with resolvers, verifiers, clients, and/or any suitable component.

The beacon 110 preferably includes a short-range communication module; however, additionally or alternatively, the beacon can include a long-range communication module, one or more short and long range communication modules, and/or any suitable means for communication. The short range communication module is preferably Bluetooth (e.g., Bluetooth low energy (BLE), classic Bluetooth, ultra-wide band (UWB), etc.); however, additionally or alternatively, the short range communication module can be near-field communication (NFC), radio frequency (RF), infrared (IR), Zigbee, Z-wave, and/or any suitable short-range communication module.

The beacon 100 is preferably associated with beacon parameters, which can include: master secret key, location, device status (e.g., battery status, lifetime, connection status such as to user devices, etc.), public identifier (e.g., beacon ID, beacon public ID, etc.), temporary identifier (TID), seed (e.g., random value), clock (e.g., synchronized to NTP time server), time window, beacon state, and/or other suitable parameters. The beacon parameters are preferably stored by the beacon platform (e.g., in a beacon registry), however, the beacon parameters can be otherwise stored. The location is preferably static; however, the location can be dynamic (e.g., actively moving, moved on a time schedule, etc.).

The beacon preferably includes a cryptography module. The cryptography module can be configured to generate secured data (e.g., payload), such as by encrypting the data, to prevent those without an appropriate key from accessing the secured secret. The cryptography module preferably uses 128-bit AES and/or SHA 256; however, any suitable encryption cipher and/or hash function can be used.

The listener 200 (e.g., a user device 500) can function to receive signal(s) (e.g., frame(s)) broadcast by the beacon and transmit said signal to the resolver and/or verifier. The listener can optionally function as a resolver (e.g., in specific variants where the listener has been verified by the verifier). However, the listener can perform any suitable function.

The listener 200 is preferably in proximity to (e.g., physically located proximal to) the beacon; however, the listener can be otherwise suitably situated. The listener is preferably communicably coupled to the beacon, the resolver, the verifier, and/or the client. However, the listener can be connected to any suitable components (e.g., the beacon, the resolver, the verifier, and/or the client), can be the same as the resolver (e.g., a user device); and/or otherwise suitably configured. The listener preferably includes a short range communication module (e.g., sharing the same protocol(s) as the beacon) and/or a long range communication module (e.g., cellular radio, WiFi radio, etc.); however, the listener can include any suitable communication modules.

The listener 200 is preferably a user device 500 (e.g., a mobile device, a laptop, personal computer (PC), smartphone, smartwatch, smart glasses, etc.); however, the listener can be any suitable computing device (e.g., a remote computing device such as the cloud, a server or remote computing system, a network, etc.). The listener is preferably configured to become a resolver (e.g., after verification); however, in variants, the listener can be precluded from becoming a resolver.

The resolver 300 can function to determine the specific beacon ID (e.g., public ID) based on the TID; however, the resolver can perform any suitable function. The resolver is preferably in communication with one or more listeners and/or one or more verifiers. However, the resolver can be the same as the listener, connected to the listeners and/or verifiers, and/or can be otherwise suitably configured.

The resolver 300 preferably independently receives beacon data (e.g., beacon information, beacon parameters, beacon frames, TIDs, etc. for beacon ID or public ID determination) from the verifier and/or the beacon (via the listener). In variants, the resolver can independently calculate beacon information based on beacon parameters. However, the resolver can be otherwise suitably configured.

The resolver 300 can be a computing system (e.g., a remote computing system boo such as the cloud, a server, etc.) and/or a user device 500 (e.g., after the user device has been verified). The resolver preferably includes a long-range communication module, however, the resolver can include a short range communication modules, and/or any suitable means for communication.

The verifier 400 (e.g., validator) preferably functions to verify the listener proximity to one or more beacons. The verifier can be the same as the resolver (e.g., a cloud resolver, a remote computing device) and/or different from the resolver (e.g., the verifier is a remote computing device and the resolver is a user device). The verifier is preferably a remote computing device 600; however, the verifier can be the beacon (e.g., the beacon can verify a challenge from the listener, such as a signed challenge sent from the verifier to the beacon via the listener), and/or any suitable computing device.

The verifier 400 preferably has access to the same information as the beacon (e.g., beacon parameters); however, the verifier can have access to different information. The verifier's information is preferably a different instance of the shared information (e.g., wherein the information is duplicated at the verifier and the secure device), but can alternatively be the same instance or any other suitable instance. The verifier is preferably configured to independently calculate the beacon state (e.g., TID, keys, etc.) from the beacon; however, information can be transferred (e.g., via the listener, via the resolver, by the beacon owner, directly, etc.) between the beacon and the verifier, and/or the verifier can access the beacon information in any suitable manner. In a specific example, the verifier stores the beacon master secret key, seed(s), time window, and clock time of the beacon. In this specific example, the verifier can independently determine the beacon TID, beacon key(s), and/or other suitable information from the beacon. However, verifier can obtain information from beacon and/or share any suitable information.

The client 700 can function to receive the beacon ID from the resolver and perform a predetermined action based on the beacon ID. Examples of the predetermined action can include: retrieving content associated with the beacon ID (e.g., from a third-party database), controlling an auxiliary device (e.g., controlling a door to open), and/or any suitable action.

The client 700 is preferably an application (e.g., a third-party application) executing on the listener and/or resolver (e.g., user device), but can additionally or alternatively be executed on a different system. The client can be a native application, a browser application, an operating system application, and/or be any other suitable application, executable, development tool (e.g., SDK), or software module.

In a specific example, the system can include a Bluetooth beacon, a user device (e.g., listener), and a server (e.g., resolver, verifier). The Bluetooth beacon can be configured to broadcast a frame with an encrypted payload. The frame can be received by the listener and transmitted to the server. The server can determine if the listener is in proximity to the beacon. If the listener is in the proximity to the beacon, the server can transmit the beacon ID to the listener. However, the system can be otherwise suitably configured.

4. Method.

The method 20 preferably functions to determine if a user (e.g., user device) is in proximity to a beacon, enable interaction between the user device and a client (e.g., to access third party applications), and/or any suitable functions. Variants of the method, for example as shown in FIGS. 8A-8D, can verify a user (e.g., if they are in proximity to the beacon), identify malicious actors (e.g., sniffers, spoofers, etc.), and/or perform any suitable function.

4.1 Generating One or More Frames.

Generating one or more frames, Block S100, preferably functions to prepare (e.g., encrypt, hash, format, etc.) data (e.g., identifiers, key(s), time, etc.) to transmit to an external device (e.g., user device). Block S100 is preferably performed before broadcasting the frame and/or verifying the proximity; however, Block S100 can be performed at the same time as broadcasting the frame and/or verifying the proximity, and/or with any suitable timing. Block S100 is preferably performed by a beacon, but can be performed by any suitable component.

Generating one or more frames preferably occurs before the time window begins; however, Block S100 can occur at the start of the time window, during the time window, upon receipt of a trigger, and/or with any suitable timing.

The frame(s) 120 can be any suitable combination of hash values, clear text, and/or ciphertext. The frame 120 preferably includes a frame identifier (e.g., frame type, frame version, etc.), a temporary identifier (e.g., TID), a randomizer, an encrypted payload, and/or an authentication tag; however, the frame can include a subset of the data, and/or any additional data. The TID within the frame is preferably cleartext, but can additionally or alternatively be hashed, encrypted, or otherwise secured or unsecured.

Generating one or more frames can include generating a TID and key(s). Generating a TID and key(s) can function to prepare a unique, dynamic identifier (e.g., TID) for the beacon, prepare one or more keys associated with the TID (e.g., root keys, hash keys, etc.) associated with the TID, and/or any suitable function. The key(s) are preferably generated before the TID; however, the key(s) can be generated at the same time as or after generating the TID. The keys generated in S100 are preferably temporary keys (e.g., ephemeral keys, rotating keys, etc.), but can alternatively be static keys or permanent keys. The TID is preferably a hash (e.g., hash value); however, the TID can be cleartext, ciphertext, and/or any suitable format. The TID and key(s) are preferably associated with a specific beacon and a specific time window; however, the TID and/or key(s) can be associated with more than one beacon, more than one time window, not associated with a time window, and/or associated in any suitable manner.

The time window is preferably a duration of time during which the time window information (e.g., TID, key(s), information calculated using the time window, information that includes the time window, etc.) is valid; however, the time window can an approximate duration of time that the time window information is valid (e.g., time window duration plus or minus 1 s, 30 s, 1 min, 5 min, etc.), and/or can be any suitable otherwise used. The time window can be a fixed time range (e.g., 8:00 am to 8:15 am, 9:27:30 am to 9:27:45 am, 12:00 am to 11:59:59 pm, etc.), can be any duration of time (e.g., recurrent, nonrecurrent) and/or range thereof (e.g., between 32 s and 4096 s such as 17 minutes), and/or any suitable amount of time. In an illustrative example, the time window is 5 minutes, wherein a new TID and keys are determined every 5 minutes.

The time window duration and/or starting times are preferably shared between the beacon and the verifier and/or resolver, but can be otherwise stored. In one variation, the time window duration and/or starting times are determined by the verifier or resolver (e.g., the server), and transmitted to the secure device (e.g., via one or more listeners or intermediaries). In a second variation, the time window duration and/or starting times are determined by the secure device, and transmitted to the verifier and/or resolver (e.g., via an intermediary). However, the time window duration and/or starting times can be predetermined and stored at manufacture, determined at beacon deployment, and/or at any other suitable time in any suitable manner.

The time window preferably includes the ends of the time window (e.g., inclusive of the start of the time window and the end of the time window); however, the time window exclude the ends of the time window.

After a time window expires, the time window information is preferably redetermined. However, time window information can be retrieved from memory (e.g., in variants where time window information associated with more than one time window is determined at the same time and cached), can be determined in response to a trigger (e.g., a call to generate new identifying information), and/or be otherwise suitably calculated. In variants including more than one time window, the time windows are preferably the same duration; however, the time windows can have different durations and/or any suitable duration.

The TID (e.g., for a given time window) is preferably generated based on a time associated with the time window (e.g., the start time, a time within the time window, the end time, etc.), but can additionally or alternatively be generated based on: the master secret key (e.g., a manufacture beacon ID, stored on the beacon during manufacture, start-up, etc.), a counter, a prior TID for the beacon (e.g., the last TID, other TIDs, etc.), and/or any suitable other information.

In a specific example, the TID can be generated (e.g., calculated) using a hash-based message authentication code (HMAC). The HMAC input can include the seed, the time window (e.g., time window duration, a time associated with the time window, etc.), an instantaneous time (e.g., read from the clock), and a hash root key. In this example, the cryptographic hash function can be MD5; SHA-1; SHA-2 such as SHA224, SHA256, SHA384, SHA512, SHA512/224, SHA512/256, etc.; SHA-3; CRC32; BLAKE2; and/or any suitable cryptographic hash function. In this specific example, the hash root key can be generated using an HMAC, where the input can include a known byte sequence (e.g., a string such as "hash root key" converted to bytes such as "68 61 73 68 20 72 6f 6f 74 20 6b 65 79"; a prior TID; etc.) and the master root key.

In a second specific example, the TID can be generated in the manner disclosed in U.S. application Ser. No. 15/921,844, filed 15 Mar. 2018 and/or U.S. application Ser. No. 16/152,254 filed 4 Oct. 2018, each of which are incorporated in their entireties by this reference. However, the TID and/or key(s) can be otherwise generated.

Generating one or more frames can include generating an encrypted payload. Generating an encrypted payload preferably functions to provide secure information (e.g., payload) that can be checked (e.g., at a verifier, at a trusted device such as one with an encryption key, etc.) to determine the user proximity to the beacon. The encrypted payload preferably includes a payload that has been secured (e.g., encrypted). Generating an encrypted payload can occur before, during, and/or after generating the TID and/or key(s). Generating an encrypted payload is preferably performed by a cryptographic module of the beacon; however, any suitable component can be used.

The payload can include a broadcast time (e.g., approximately the instantaneous time that the frame is broadcast, such as within 1 ms, 5 ms, 10 ms, 100 ms, 1 s, etc. of the broadcast), and a device status. The broadcast time is preferably a single time; however, additionally or alternatively, the broadcast time can be a series of times (e.g., times corresponding to a series of frames; times corresponding to a series of steps such as generating the TID, generating the key(s), etc.; series of times corresponding to broadcasting the frame(s); etc.). The broadcast time can be: the payload generation time, the TID generation time, the encryption key generation time, the frame generation time, an estimated broadcast time, a schedule broadcast time, and/or any suitable time. The broadcast time is preferably within the time window (e.g., used to generate the TID and key(s)) but can additionally or alternatively be outside the time window. However, the payload can include any suitable data.

The payload is preferably secured (e.g., encrypted) using a block cipher algorithm (e.g., advanced encryption standard (AES), Blowfish, data encryption standard (DES), Serpent, Twofish, etc.); however, a stream cipher algorithm (e.g., Rivest Cipher 4 (RC4), Salsa 20, ChaCha, etc.), block cipher in stream mode, etc.), and/or any suitable algorithm can be used. Different payloads (e.g., associated with different frames, different time windows, etc.) are preferably secured using the same algorithm; however different algorithms can be used. The algorithm is preferably an Authenticated Encryption with Associated Data (AEAD); however, any suitable algorithm can be used.

The block cipher algorithm is preferably operated in encrypt-then-authenticate-then-translate (EAX) mode of operation; however, the algorithm can be operated in Counter with CBC-MAC (CCM), Carter-Wegman+CTR mode (CWC), Galois-Counter Mode (GCM), Integrity Aware Parallelizable Mode (IAPM), Offset Codebook Mode (OCB), Extended Ciphertext Block Chaining (XCBC), Cipher Block Chaining (CBC), Integrity Aware CBC (IACBC), Sophie Germain Counter Mode (SGCM), and/or any suitable mode of operation.

The encryption key can be static, generated (e.g., based on the time window such as a start time of the time window, based on the duration of the time window, etc.), received from the validator, and/or otherwise determined. The encryption key is preferably associated with the TID (e.g., be a temporary key generated based on and/or within the same time window as the TID), but can additionally or alternatively be a predetermined key associated with the TID, be unassociated with the TID, or be any other suitable key.

In a specific example, the encrypted payload is generated (e.g., calculated) using AES-EAX (AES operating in EAX mode) encryption. The encryption inputs can include a frame identifier, a TID, a nonce, a payload, an encryption key, and/or any suitable information. The nonce, for example, can be generated from an instantaneous time and a randomizer; however, the nonce can be generated in any suitable manner. The encryption key can be generated using an HMAC. In this example, the inputs to the HMAX can be a seed, a known byte sequence (e.g., a string such as "encryption key" converted to bytes such as "65 6e 63 72 79 70 74 69 6f 6e 20 6b 65 79", a prior encryption key, etc.), a time (e.g., an instantaneous time, a time window time such as the start of the time window, a broadcast time, etc.), and a hash root key; however, the encryption key can be generated in any suitable manner.

4.2 Broadcasting a Frame.

Figure 4A:
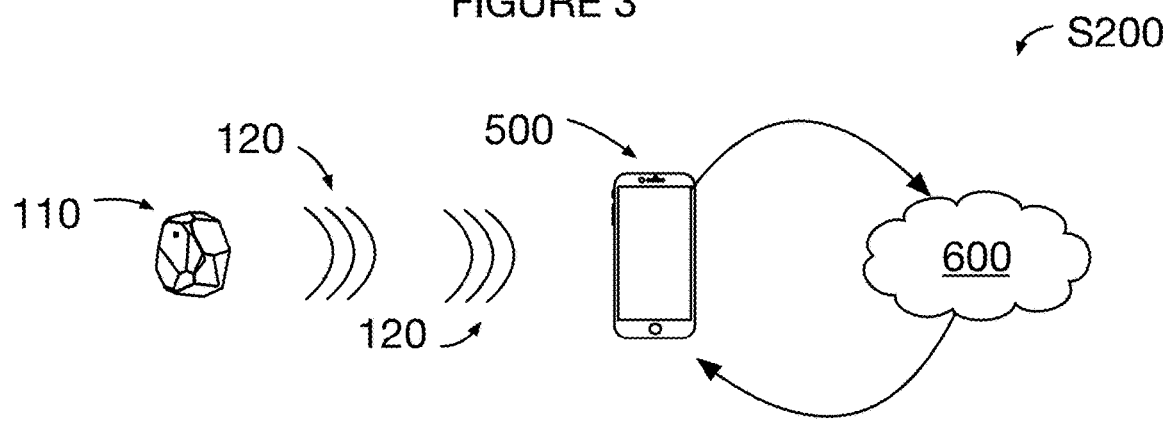
FIGS. 4A and 4B are schematic representations of examples of broadcasting a frame, each showing an example of broadcasting frames during a time window.
Figure 4B:
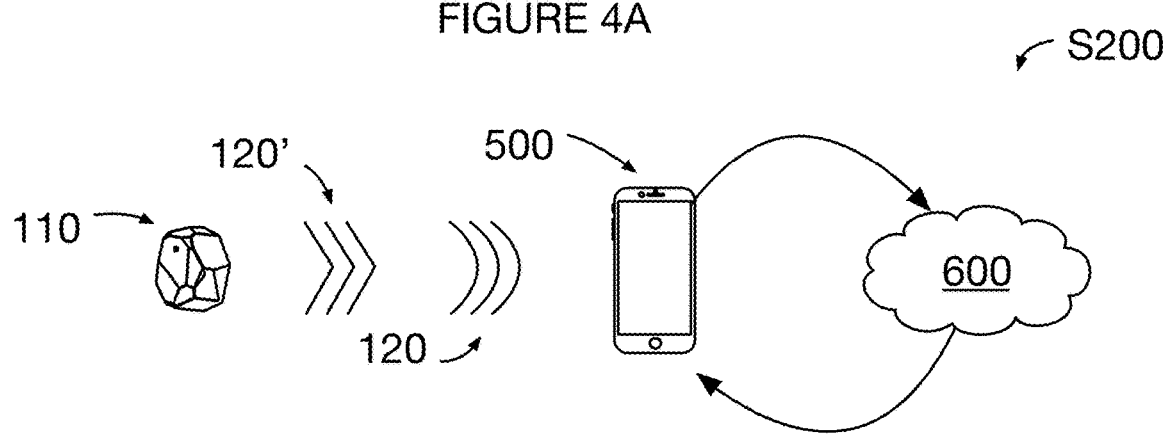

Broadcasting a frame, block S200, preferably functions to transmit a frame for possible detection (e.g., by a listener, for example as shown in FIGS. 4A and 4B, etc.). Sequential frames can be the same or different (120'). Block S200 preferably occurs after generating a frame; however, block S200 can occur at the same time as block S100. In a first example, the frame is broadcast within a predetermined duration after the broadcast time. The predetermined duration can be: a unit duration (e.g., a time unit by which the beacon clock increments the time counter), the time window duration, a predetermined duration (e.g., any duration or range thereof between 0 s and 60 s such as 2 s), and/or any suitable time duration. However, broadcasting a frame can occur at any suitable timing. Block S200 is preferably performed by a communication module of a secure device (e.g., beacon), but additionally and/or alternatively any suitable component can be used.

Frames are preferably broadcast by a beacon and received by a listener. The listener can transmit a received frame to a verifier and/or to a resolver. Additionally or alternatively, the listener can store a series of frames (e.g., associated with different time windows, associated with the same time windows, sequential frames, etc.) before transmitting them, the beacon can broadcast more than one frame, and/or the frames can be broadcast and transmitted in any suitable manner. Each frame is preferably unique (e.g., different payload, different TID, different key(s), etc.); however, frames can be the same (e.g., during a time window).

Frames are preferably broadcast at a predetermined frequency (e.g., every 0.1 s, 1 s, 2 s, 10 s, 30 s, 60 s, etc.; once every time window, a predetermined number of times within a time window, a predetermined frequency independent of time window durations, etc.); however, frames can be broadcast at random times, after being triggered, and/or at any suitable time. The predetermined frequency can be specified by the beacon platform (e.g., in response to a user, owner, etc. setting receipt) and transmitted to the beacon (e.g., via an intermediary, such as a proximal user device, a secondary beacon, etc.), be a static value, be a dynamic value (e.g., based on time, time of day, etc.), and/or be otherwise suitably determined. Frames are preferably not broadcast while a frame (e.g., the same frame or the next frame) is being generated, but frames can be broadcast while generating the frame.

Frames are preferably broadcast in a substantially spatially uniform manner (e.g., signal strength a given distance away from the beacon is approximately the same such as differs by <5%, <10%, 20%, etc. in all directions). Additionally or alternatively, the frame can be broadcast in a directed manner (e.g., in a specific direction), in a semi-directed manner (e.g., in front of the beacon, to a fixed height above the beacon, etc.), and/or can be broadcast in any suitable manner.

4.3 Verifying the Proximity.

Verifying the proximity of a user device to a beacon (e.g., verifying the proximity), block S300, preferably functions to check if and verify that a user device is within a predetermined proximity to a beacon. Block S300 can optionally function to transition a listener to a resolver and/or perform any suitable function. The predetermined proximity (e.g., proximity), can be: defined by a beacon (e.g., set by an owner, operator, manufacturer, etc.), the greatest distance that a listener can receive the beacon signal (e.g., directly from the beacon, from a beacon extender, etc.), a distance where the received signal strength (RSSI) is greater than a threshold signal strength (e.g., greater than −100, −70, −60, −50, −40, etc.), any distance and/or range thereof between 0-100 m, and/or otherwise suitably defined.

In response to proximity verification, the system (e.g., verifier, client, resolver, etc.) can: provide sensitive data (e.g., the beacon ID, public identifier, etc.) to the listener, trigger an action at a predetermined end point associated with the beacon (e.g., charge a user account associated with the beacon, open a door associated with the beacon, etc.), enable additional functionalities (e.g., beacon programming, transition listener to resolver, etc.), and/or perform any suitable action.

In response to proximity rejection, the system (e.g., verifier, client, resolver, etc.) can: notify a managing entity (e.g., the beacon platform, an entity associated with the beacons, etc.), trigger key re-cycling (e.g., by instructing the beacon to start a new time window), trigger implementation of other security protocols or methods (e.g., locking all doors associated with the beacon, sounding alarms, etc.), ban the listener (e.g., temporarily, permanently, etc.), and/or perform any suitable action.

Block S300 is preferably performed by a verifier (e.g., in communication with a listener); however, block S300 can be performed by any suitable component. Block S300 preferably occurs after broadcasting the frame; however, part or all of block S300 can occur at the same time and/or before block S100 and/or block S200.

The proximity verification (e.g., verifying the proximity) is preferably based on a time parameter. The time parameter is preferably based on the broadcast time and a receipt time (e.g., an instantaneous time when the frame is received at the verifier), but can be determined based on any other suitable data (e.g., RSSI, wherein the packet delay is cross-referenced with the RSSI; etc.). The time parameter can be a packet delay (e.g., receipt delay, difference between a broadcast time and a receipt time, etc.), an average packet delay (e.g., average difference between successive broadcast times and respective receipt times), a packet stability (e.g., based on a difference between successive packet delays; based on a difference between a broadcast delay, calculated between successive packets or broadcasting times, and a receipt delay, calculated between successive packets or receipt times; etc.), average packet stability (e.g., average difference between successive packet stabilities), and/or any suitable combination. Additionally or alternatively, the proximity verification can be based on a location sensor (e.g., of the user device such as GPS, GNSS, etc.), receiving signals from more than one beacon in a given geolocation, connection to a local server (e.g., local WiFi network), optical location detection (e.g., scan QR code, computer vision from image and/or video of location, etc.), and/or any suitable means for detecting a listener proximity to a beacon.

The proximity is preferably verified when the time parameter for the packet (or frame) is less than a target time parameter (e.g., <1 ms, <10 ms, <100 ms, <1 s, <1 min, etc.); however, the proximity can be verified when the time parameter falls within a predetermined range (e.g., 0-100 ms, 10-300 ms, 5 ms-60 s, etc.), and/or be otherwise verified when the time parameter satisfies any other suitable set of conditions. The target time parameter can be an absolute value, a normalized value (e.g., of historical time parameter values for the beacon, for a beacon population, etc.), an absolute range, a normalized range, and/or any suitable time. In a specific example, when the time delay between the broadcast time and receipt time is less than a threshold value (e.g., 1 s) the proximity of the listener (e.g., user device) to the beacon can be confirmed (e.g., verified). In a second specific example, a malicious actor 110' can be detected and/or the listener proximity can be rejected or invalidated when the time parameter for the current frame(s) exceed the target time parameter (e.g., for a single frame, a threshold number of frames, etc.). However, proximity verification can occur in any suitable manner.

The proximity verification can be valid (e.g., remain in effect, not be rechecked, etc.) for: the remainder of the time window, a duration approximately equal to the time window duration, on a frame-by-frame basis (e.g., valid for the frame that the time parameter was calculated for), for any suitable amount of time and/or range thereof between 1 s-24 hrs (such as 30 minutes), until a change in user device and/or beacon is detected (e.g., location sensor indicates relative movement of the beacon and user device, user device is turned off, user device is idle for a predetermined amount of time, the beacon resets, etc.), based on verifier instructions (e.g., command to reset proximity verification, receipt of trigger to reset, etc.), and/or for any suitable duration of time.

Verifying the proximity can include associating the frame with a receipt time. Associating the frame with a receipt time can function to associate an approximate receipt time (e.g., within 1 ms, 10 ms, 100 ms, 1 s, etc.) with the frame. Associating the frame with a receipt time is preferably performed by a verifier upon (e.g., immediately, with a known time delay, etc.) receipt of the frame at the verifier from the listener and/or resolver; however, associating the frame with a receipt time can be performed by a resolver and/or any suitable component. Associating the frame with a receipt time can be performed before, during, and/or after generating the key and TID.

The receipt time is preferably stored as a series of receipt times (e.g., corresponding to a series of frames); however, the receipt time can be stored as individual data values, used immediately upon determination (e.g., without being stored), and/or stored in any suitable manner. The receipt time can be: the time the frame arrives at the verifier, the decryption time (e.g., the time the encrypted payload is decrypted), the read time (e.g., the time the frame is interpreted), an estimated receipt time, and/or any other suitable time. The receipt time is preferably within the time window, but can additionally or alternatively be outside the time window.

Verifying the proximity can include extracting information from the frame(s). Extracting information from the frame(s) functions to retrieve information from one or more frames. Extracting information from the frame(s) preferably occurs after associating the frame with the receipt time; however, extracting information from the frames can occur at the same time as associating the frame with the receipt time. Extracting information from the frame(s) can occur at a verifier (e.g., a cryptographic module of a verifier), a listener, a resolver, and/or any suitable component.

Extracting information from the frame can include reading data (e.g., hash values, cleartext, etc.), decrypting data (e.g., ciphertext) with a decryption key, and/or any suitable steps. The decryption key is preferably a symmetric key (e.g., be an encryption key; wherein the same key can be stored and/or generated at the secured device and the verifier; etc.), but can alternatively be part of an asymmetric key pair (e.g., the private key, the public key, etc.).

In one variation, the decryption key (hereinafter synonymous with encryption key for the symmetric key variant) is static for all frames transmitted by the beacon. In this variation, the decryption key can be retrieved based on the beacon identifier (e.g., public ID, master secret key, etc.) that is determined from the transmitted TID, and/or otherwise suitably determined.

In a second variation, the decryption key is specific to a given TID, and rotated with the TID. In one embodiment, the decryption key is generated from the TID. In a second embodiment, the encryption key is generated from a common parameter (e.g., a time associated with the time window) as the TID. In this variation, the method can include independently generating the TID and/or key(s) at the verifier.

Independently generating the TID and/or key(s) at the verifier can function to provide the TID and associated keys to the verifier (e.g., without needing to receive them from the beacon). Independently generating the TID and/or key(s) can be before, during and/or after generating the TID and key(s) at the beacon. Independently generating the TID and/or key(s) is preferably independent of generating the TID and/or key(s) beacon; however, independently generating the TID and/or key(s) at the verifier and beacon can be dependent on one another. Independently generating the TID and/or key(s) preferably generates the TID and corresponding key(s) for more than one time window at a time and stores the series of TIDs and/or key(s); however, independently generating the TID and/or key(s) can be computed for each time window (e.g., individually), in response to a trigger, and/or with any suitable timing. Independently generating the TID and/or key(s) is preferably performed in the same manner as block S100; however, any suitable manner can be used. Additionally or alternatively, the TID and associated key(s) can be stored at the verifier and beacon (e.g., at the time of manufacture, by an owner, by an operator, etc.), communicated between the beacon and verifier, and/or the TID and key(s) can be generated at the beacon and verifier in any suitable manner.

In a specific example, extracting information from the frame can include at the verifier, decrypting the encrypted payload (e.g., to extract a cleartext broadcast time). Decrypting the encrypted payload can function to allow the verifier to access the broadcast time. In a second specific example, extracting information can include reading the TID and retrieving the TID-associated key at a resolver. In a third specific example, extracting information can include extracting a frame ID at a listener. However, additionally or alternatively, extracting information from the frame can include any suitable steps.

Verifying the proximity can include determining a time parameter. Determining a time parameter can function to calculate a time parameter associated with the frame (e.g., associated with the broadcast time of the frame and the receipt time of the frame). Determining a time parameter preferably occurs at a verifier, but can occur at any suitable component. Determining a time parameter preferably occurs after extracting information from the frame; however, determining a time parameter can occur at the same time as extracting information from the frame.

Figure 6:
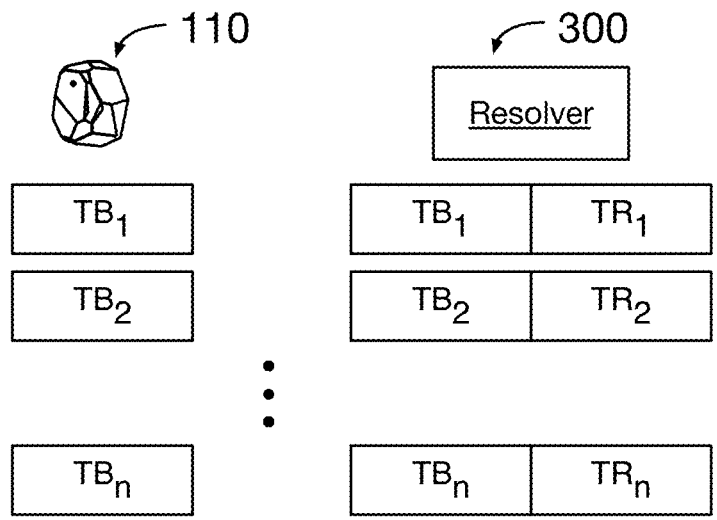
FIG. 6 is a schematic representation of embodiments of time parameters.
Figure 7:
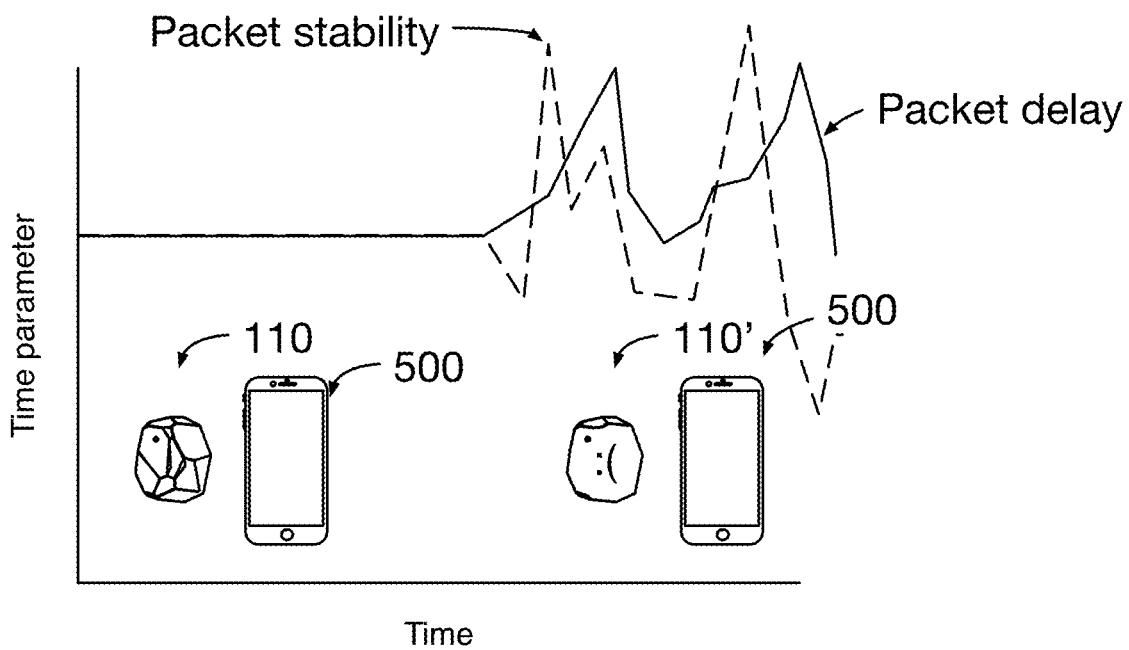
FIG. 7 is a schematic representation of an example of verifying the proximity based on example time parameters.
Figure 8A:
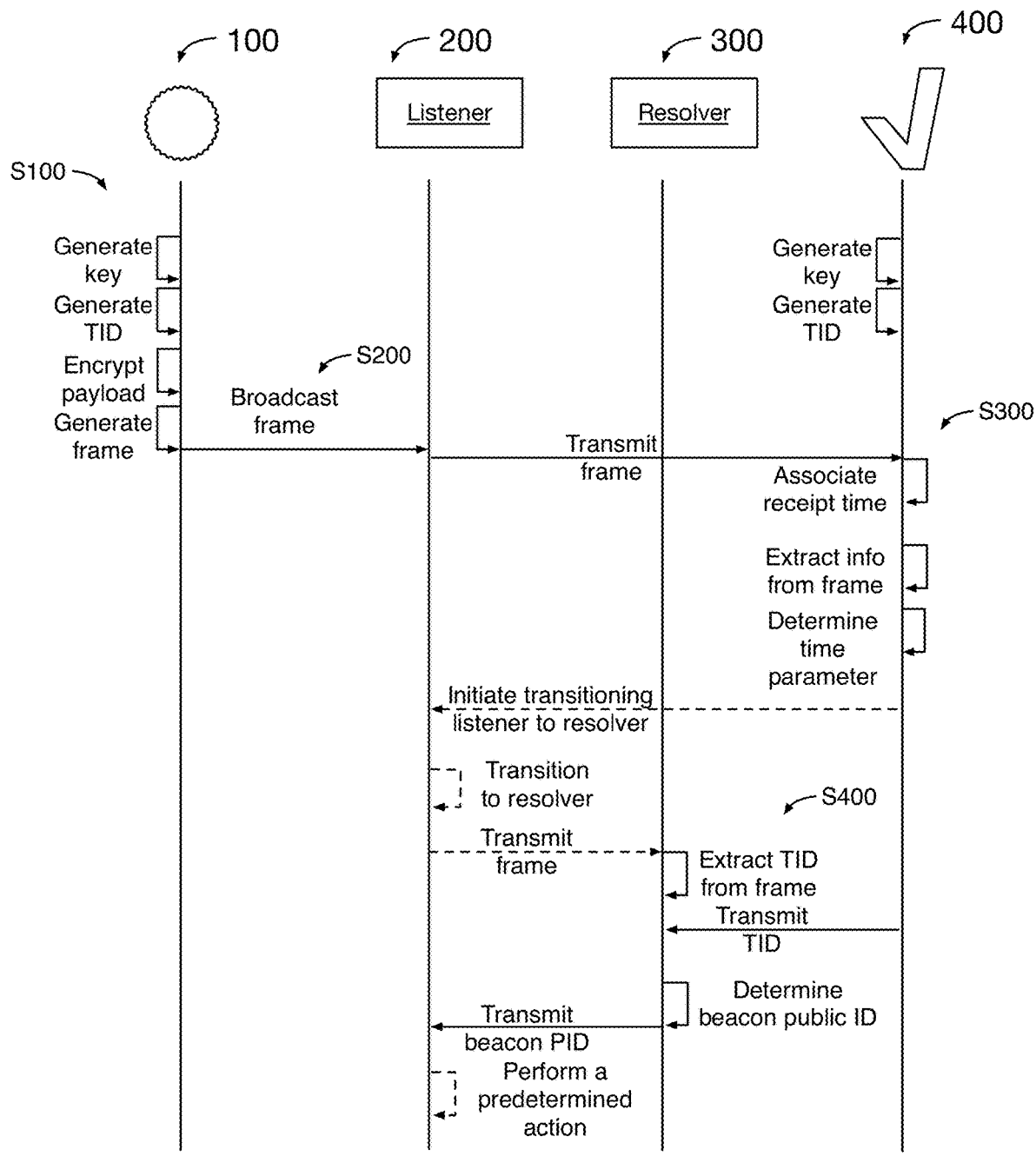
FIG. 8A-8D are schematic representations of variants of the method.
Figure 8B:
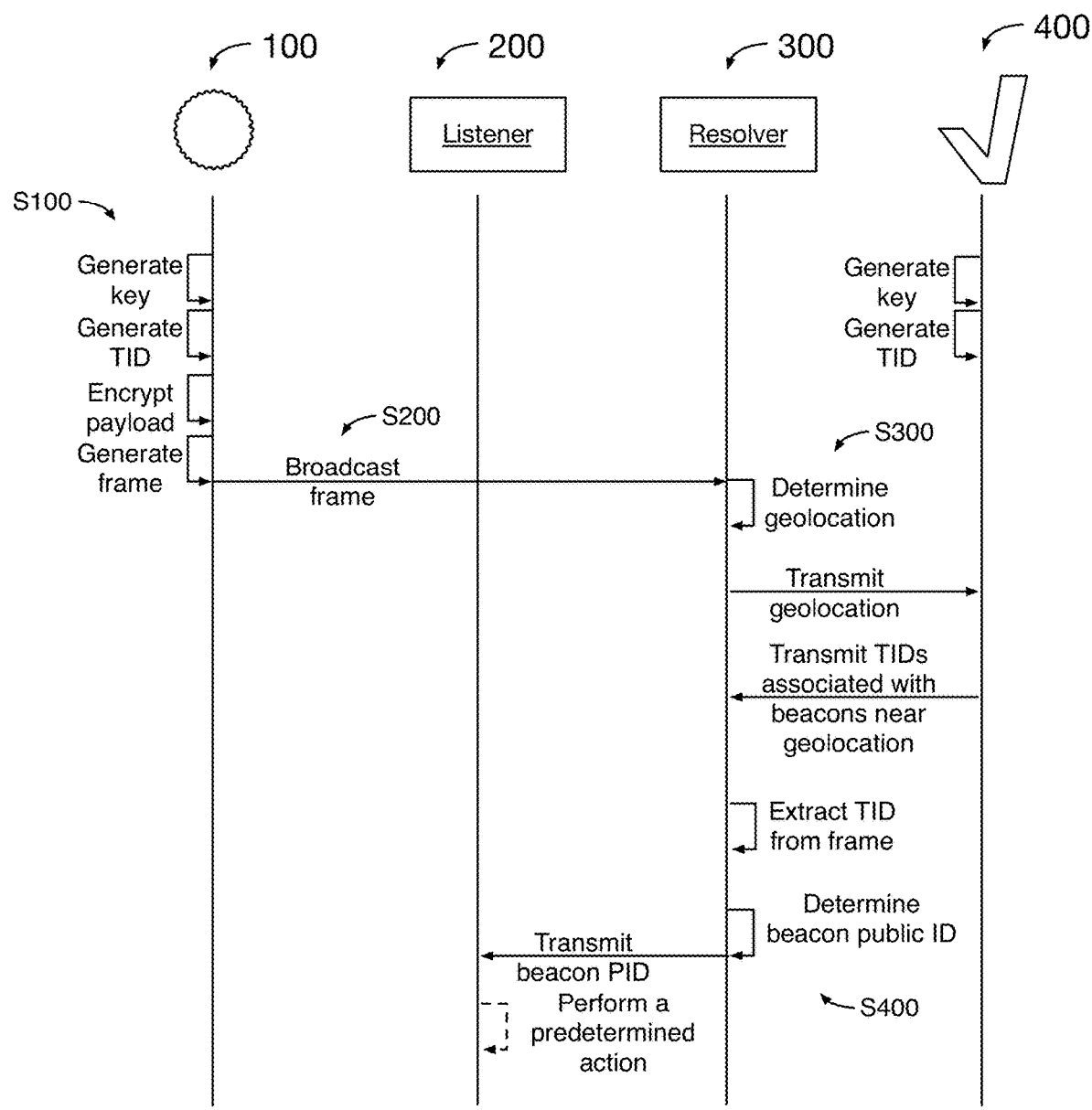
Figure 8C:
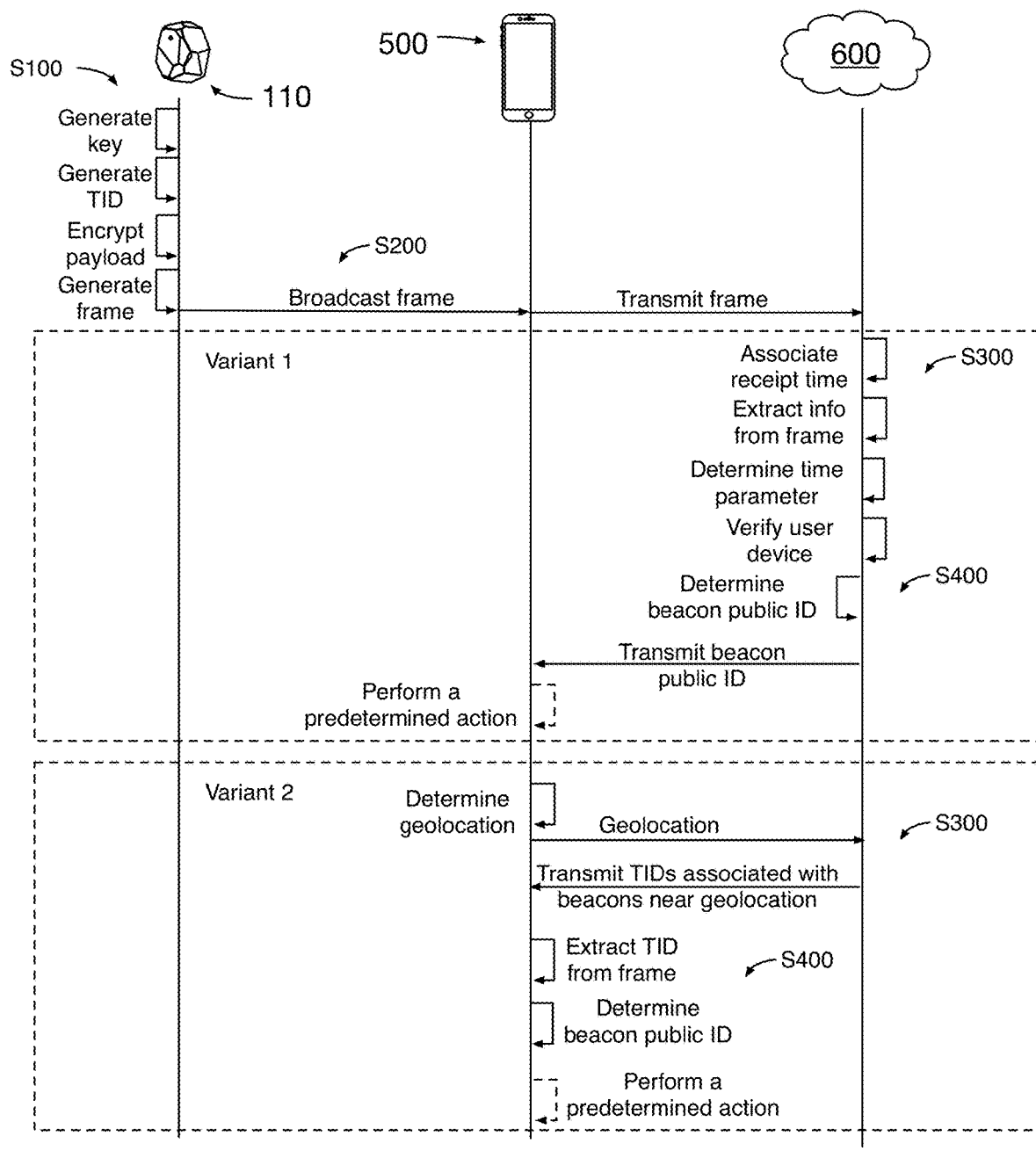
Figure 8D:
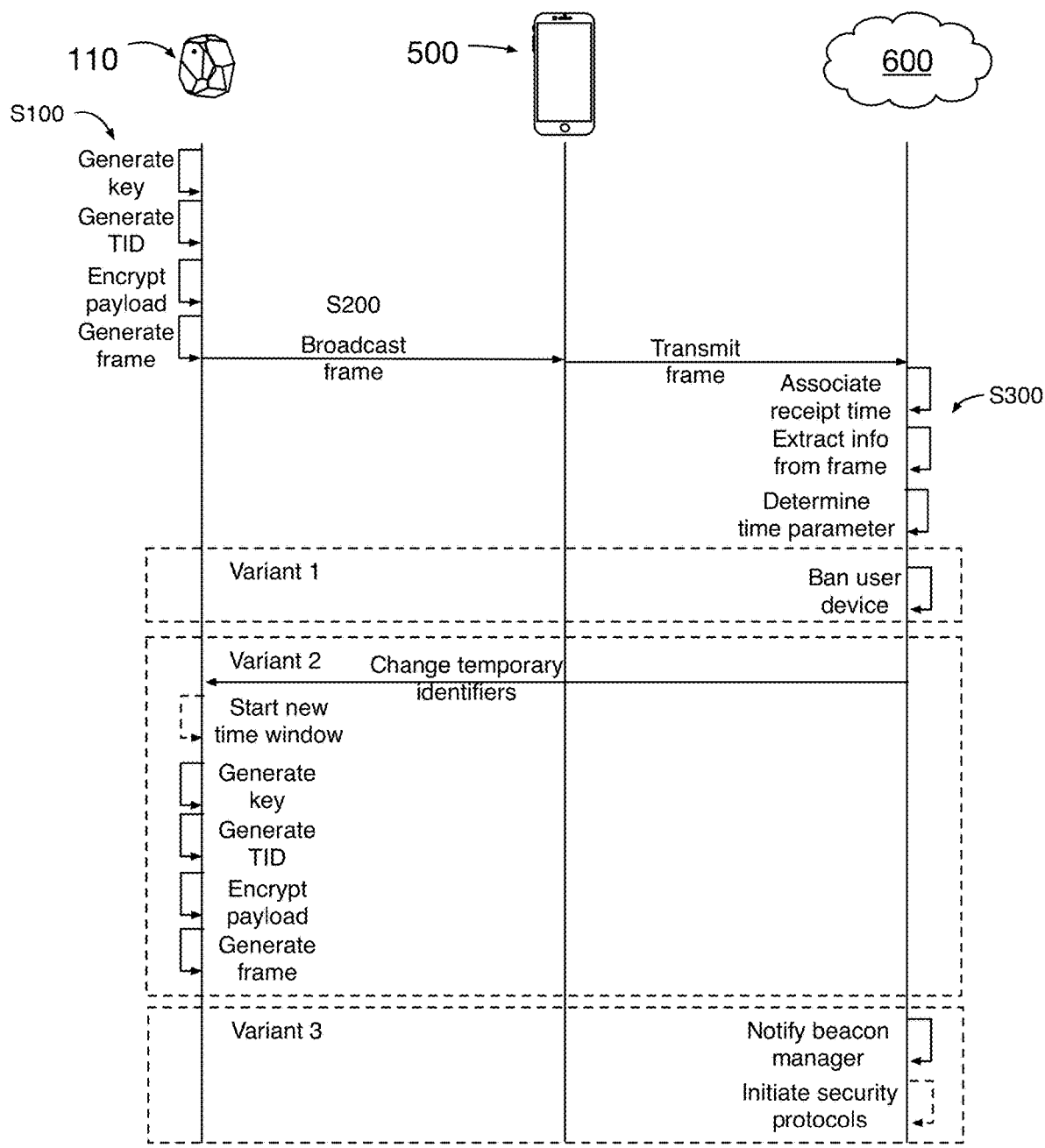

Determining a time parameter, for example as shown in FIG. 6, can include determining a single point time difference (e.g., time delay, transmission delay, between the broadcast time and receipt time, etc.), an average of time differences (e.g., for a series of frames, calculating the time difference of each frame and calculate the average of those time differences, etc.), a single point time stability (e.g., packet stability, the difference between the time difference for two consecutive frames, the difference between broadcast time and the difference between receipt times for consecutive frames, etc.), an average time stability (e.g., the average time stability for a series of frames), and/or any suitable time parameter metric. Determining a time parameter can include comparing the time parameter to a target time parameter, for example as shown in FIG. 7.

In a specific example, verifying the proximity can include: receiving the frame at the verifier (from a listener) at a receipt time; determining an encryption key for the frame (e.g., based on the TID extracted from the frame);

extracting the broadcast time from the frame (e.g., by decrypting the encrypted payload with the encryption key); determining a time parameter based on at least the broadcast time and the receipt time; and verifying the listener proximity to the secure device upon time parameter satisfaction of a set of verification conditions (e.g., the calculated time parameter is within a predetermined deviation from a historical time parameter value for the beacon). However, the proximity can be otherwise verified.

Verifying the proximity can optionally include transitioning a listener to a resolver. Transitioning a listener to a resolver preferably functions to change a device state from a listener to a resolver (e.g., transition a user device from a listener to a resolver) when the listener proximity is verified, but can be transitioned at any other suitable time, in response to any other suitable condition being met. Transitioning a listener to a resolver preferably occurs after determining the time parameter (e.g., wherein the listener proximity to the beacon can be verified); however, transitioning a listener to a resolver can occur at the same time as determining the time parameter. The resolver status is preferably conferred for the same amount of time as the proximity verification is valid; however, the resolver status can be conferred for a predetermined amount of time or any suitable amount of time.

4.4 Providing a Beacon Identifier.

Providing a beacon identifier, block S400, can function to determine the beacon identifier for a specific beacon, transmit the beacon identifier (e.g., to the listener, to the resolver, to a user device, etc.), and/or perform any suitable function. A beacon identifier is preferably provided to a listener by a resolver; however, providing a beacon identifier can be performed by a verifier and/or any suitable component. Providing a beacon identifier preferably occurs after validating the proximity, but can additionally or alternatively occur concurrently with proximity validation, before proximity validation, independently of proximity validation, and/or at any other suitable time.

Providing a beacon identifier can include extracting the TID from the frame, receiving one or more TIDs from the verifier, determining a beacon public identifier, performing a predetermined action, and/or any suitable steps.

In specific variants of the method, receiving one or more TIDs from the verifier (e.g., receiving TIDs) can include, at the resolver (e.g., user device, server), receiving a set of TID-associated information and corresponding set of beacon public IDs from the verifier. In a first variation, the resolver calculates the TID-associated information (e.g., wherein the resolver can also be the verifier, can be the server, etc.). In a second variation, the set of beacons for which public IDs are received can be beacons within a geographic region proximal the resolver (e.g., within a predetermined distance of the resolver), determined based on the geolocation of resolver, wherein the resolver's geolocation can be determined from a secondary service, such as the user device's GPS radio. In this variation, the listener/resolver cannot resolve TIDs outside of the listener/resolver's actual proximity, because the listener/resolver only has access to the local beacons' resolution data (e.g., beacon public IDs and corresponding TIDs).

Figure 5:
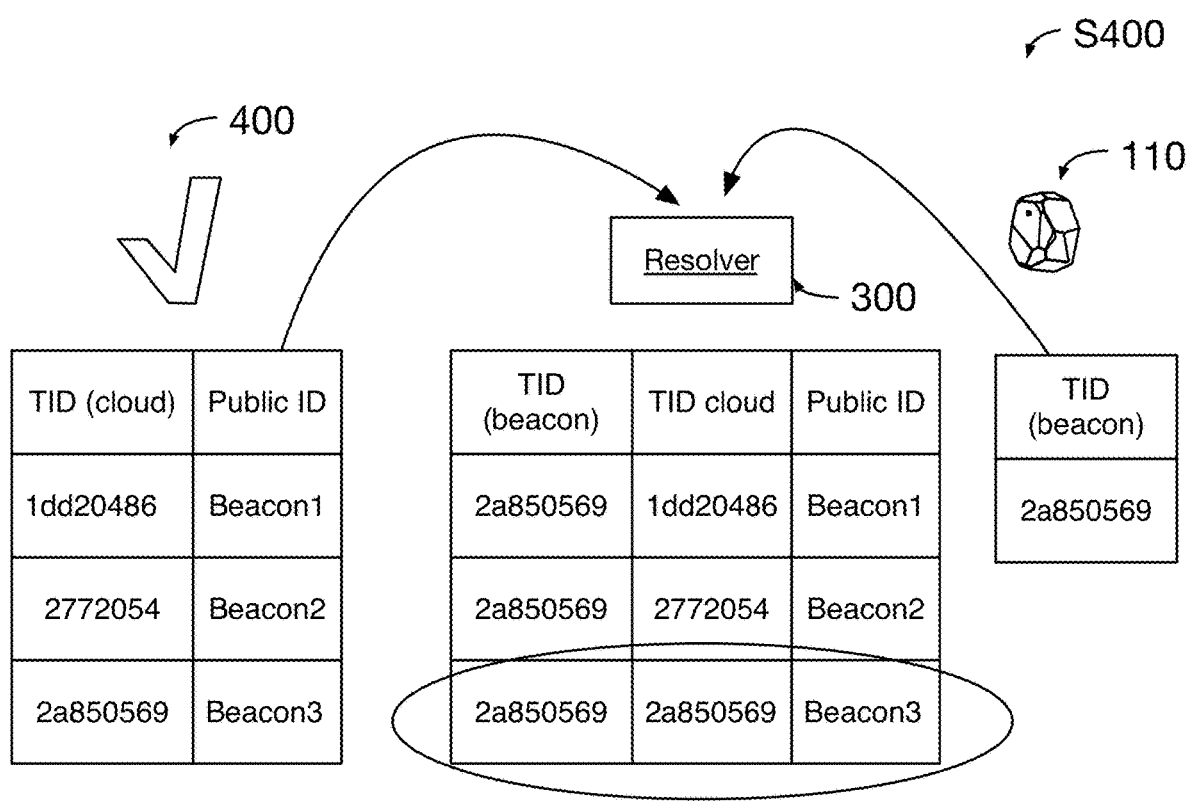
FIG. 5 is a schematic representation of an embodiment of determining a beacon public identifier (ID).

In a specific example, as shown in FIG. 5, the set of TID-associated information for the set of beacons can include a look-up table. The look-up table can include the TID-associated information (e.g., the TIDs as hash values, TID hash, etc.), one or more hash keys (e.g., TID hash key, a different hash key for each TID or TID hash, etc.), and/or the corresponding beacon's public ID. However, the look-up table can include any suitable information, and the TIDs can be sent in any suitable format. In this specific example, determining a beacon public ID can include matching an analysis hash (e.g., a TID hash, such as generated using the TID from the frame and the TID hash key from the verifier) to the TID hashes in the look-up table. When a match is found, the secure device can be identified as the public identifier associated with the analysis hash. However, determining a beacon public ID can be performed in any suitable manner.

Performing a predetermined action is preferably performed by the listener, based on instructions from the client and based on the beacon's public identifier. Performing a predetermined action can occur at any suitable time before, during, and/or after receiving the beacon public ID. The predetermined action can be client specific (e.g., accessing a third-party application or database, accessing client database, etc.), depend on the beacon identifier (e.g., access different clients, different client applications, etc.), client-specified (e.g., an action, based on the beacon public identifier, that is specified by the client, etc.), user device specified, and/or any suitable action.

Figure 9:
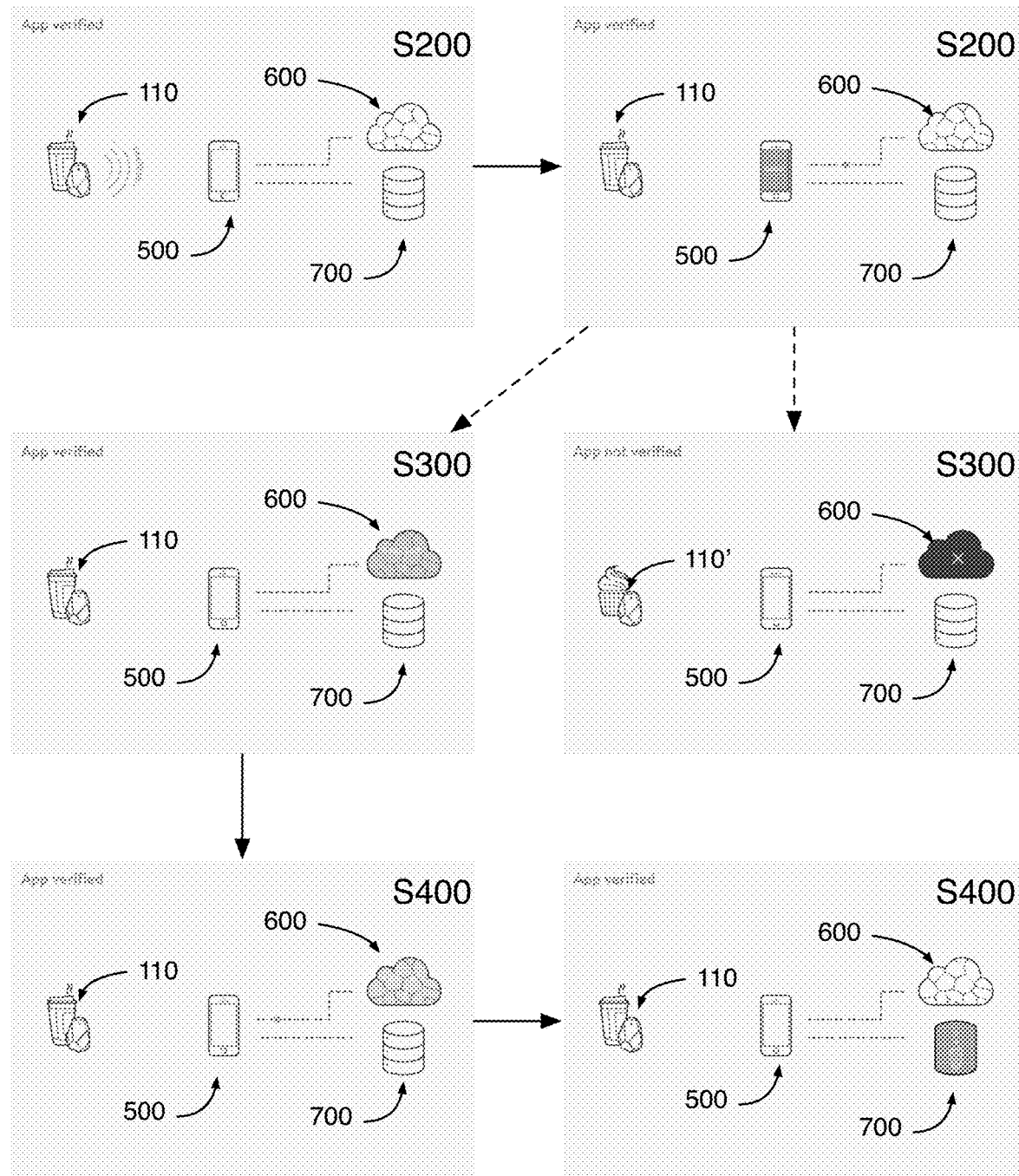
FIG. 9 is a schematic representation of an example flow path for a good actor and a bad actor.

In a first specific example, as shown in FIG. 9, the beacon temporary ID and associated key (e.g., time-window key) can be generated at the beacon based on the time window (e.g., time window duration, an instantaneous time within the time window, time window start time, etc.). In this specific example, the beacon temporary ID and associated key can be hash values and/or cleartext. At the beacon, a payload, including a broadcast time, can be encrypted (e.g., using AES-AEX encryption function). The beacon can generate and broadcast a frame including the encrypted payload, the beacon temporary ID (e.g., as cleartext), and the time-window key. The frame can be received by a listener (e.g., user device). The listener can transmit the frame to a verifier (e.g., remote computing device). The verifier can, independently from the beacon, generate the beacon temporary ID and associated key. Upon receiving the frame, the verifier can associate a receipt time with the frame. The verifier can extract the broadcast time from the encrypted payload. The verifier can then determine a time parameter, such as a packet delay, based on the broadcast time and receipt time. If the time parameter is within a predetermined range of a time delay (e.g., a normalized time delay), the proximity of the listener to the beacon can be validated (e.g., confirmed); otherwise, the listener proximity can be rejected. After validating the proximity of the listener to the beacon, a resolver (e.g., the verifier, a remote computing device, a user device, etc.) can provide the beacon public ID. The beacon public ID can be used to perform a predetermined client action (e.g., client-specified action).

In a second specific example, the beacon temporary id and associated key (e.g., time-window key) can be generated at the beacon based on the time window (e.g., duration, instantaneous start time, etc.). In this specific example, the beacon temporary id and associated key can be hash values and/or cleartext. At the beacon, a payload, including a broadcast time, can be encrypted (e.g., using AES-AEX encryption function). The beacon can generate and broadcast a frame including the encrypted payload, the beacon temporary id, and the time-window key. The frame can be received by a listener (e.g., user device). The listener can transmit the frame to a verifier (e.g., remote computing device). The verifier can, independently from the beacon, generate the beacon temporary ID and associated key. Upon receiving the frame, the verifier can associate a receipt time with the frame. The verifier can store (e.g., cache) more than one frame. The verifier can extract the broadcast time from each of the encrypted payloads determined from the frames. The verifier can then determine a time parameter, such as a packet delay, average packet delay, packet stability, average packet stability, and/or any other suitable metric based on the broadcast times and receipt times. If the time parameter is within a predetermined range of a time parameter value, the proximity of the listener to the beacon can be validated (e.g., confirmed). After validating the proximity of the listener to the beacon, a resolver (e.g., the verifier, a remote computing device, a user device, etc.) can provide the beacon public ID. The beacon public ID can be used to perform a predetermined client action (e.g., client-specified action).

In a third specific example, after a verifier (e.g., remote computing device) validates the proximity of the listener (e.g., user device) to a beacon, the listener can become a resolver. In this example, the resolver can receive a set of beacon TIDs and corresponding beacon public IDs from the verifier. The set of beacon TIDs that is received can be determined based on a geolocation of the resolver (e.g., all beacons within a predetermined distance such as 50 ft, 500 ft, 1000 ft, 2500 ft, etc., of the resolver; all beacons within a predetermined geofence associated with and/or encompassing the resolver's geolocation, etc.). The resolver can determine the beacon public ID by matching the TID received from the beacon to the TID received from the verifier. The beacon public ID can be used to perform a predetermined client action (e.g., client-specified action). The user device can remain a resolver for the duration of the time window before transitioning back to a listener, and/or for any other period of time. However, the system and/or method can include any suitable components and/or steps and can function in any suitable manner.

In a fourth specific example, generating the frame (e.g., at the secure device) includes: calculating a root key (e.g., 32 bytes long): SRK=HMAC("SRK", MSK), where MSK can be the master secret key; calculating a temporary ID (e.g., 10 bytes long, wherein "|" can indicate concatenation): TID=HMAC(SEED|"TID"|$TS_{KRPS}$|KRPS, SRK), where $TS_{KRPS}$ can be the time from the secured device's clock counter (e.g., seconds counter; synchronized to the verifier and/or resolver's clock, etc.), where KRPS can be the time window; calculating an encryption key (e.g., 16 bytes long): SPEK=HMAC(SEED|"SPEK"|$TS_{KRPS}$|KRPS, SRK); calculating a duration since the beginning of the current resolving window (TMSW; e.g., 3 bytes): TMSW=TMS−1000*$TS_{KRPS}$, where TMS is the broadcast time and/or the time from secured device's second clock counter (e.g., milliseconds counter; initialized at manufacture and/or synchronized to the verifier and/or resolver's clock); preparing a payload based on the TMSW: P=(TMSW, . . . ); encrypting the payload, and optionally creating an authentication tag (e.g., 10 bytes long): (EP, TAG)=AES_EAX_ENC (0x1E|TID, N, P, SPEK, 80); and assembling a frame: EF=0x1E|TID|R|EP|TAG.

On the resolver and/or verifier side, the SRK, TID, and SPEK can be calculated in the same way as the secured device. The SRK, TID, and SPEK can optionally be calculated for future timeframes (e.g., future values of $TS_{KRPS}$). The TID-associated information can optionally be calculated. In one example, this can include: calculating a Temporary ID Hash Key: TIDHK=HMAC(SEED-|"TIDHK"|$TS_{KRPS}$|KRPS, SRK); calculating a temporary ID hash: TIDH=HMAC(TID, TIDHK); calculating period boundaries when the data is valid in relation to the secure device's timer offset: PERIOD=(OFFSET+$TS_{KRPS}$, OFFSET+$TS_{KRPS}$+$2^{KRPS}$), where offset can be the difference between the resolver's clock and the beacon's clock(s) (e.g., at initialization); and creating a map associating the Secured Device's Public ID, Temporary ID Hash Key and Temporary ID Hash: MAP={(PUBLIC_ID, TIDH, TIDHK, PERIOD), . . . }. Resolving the frames can include: calculating the SRK, TID, and SPEK in the same way as the secured device; optionally verifying that a frame begins with 0x1E, decomposing the encrypted frame, checking if the TID is present in the precalculated values; optionally verifying the integrity of the encrypted payload; decrypting the payload: P=AES_EAX_DEC(FT|TID, N, EP|TAG, SPEK, 80) where N is a nonce; extracting the TMSW value from the decrypted payload (e.g., milliseconds since the beginning of the current Resolving Window or valid Resolving Windows within a threshold time of the current time); determining the broadcast time and/or reference time: TMS=1000*$TS_{KRPS}$+TMSW; and analyzing the TMS value (e.g., using absolute packet delay, packet stability, etc.) to determine whether the listener is proximal the secure device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for verifying a proximity of a user device to a beacon, the method comprising:
    at the beacon:
        for a time window, generating a time-window key and a temporary identifier (temporary ID) based on a window time of the time window;
        generating an encrypted payload by encrypting a payload, comprising a broadcast time, with the time-window key;
        generating a frame comprising the temporary ID and the encrypted payload; and
        near the broadcast time and during the time window, broadcasting the frame; and
    at a remote computing device:
        independently from the beacon, generating the time-window key and the temporary ID for the time window;
        receiving the frame at a receipt time from the user device;
        extracting the temporary ID from the frame;
        extracting the broadcast time from the encrypted payload based on the time-window key associated with the temporary ID;
        determining a time parameter based on the receipt time and the broadcast time;
        verifying the proximity of the user device to the beacon based on the time parameter; and
        after verifying the proximity, transmitting a beacon identifier to the user device, wherein the user device performs a client-specified action based on the beacon identifier.

2. The method of claim 1, wherein the proximity verification is valid during the time window.

3. The method of claim 1, wherein the time parameter comprises a transmission delay between the broadcast time and the receipt time.

4. The method of claim 3, wherein verifying the proximity comprises determining that the transmission delay is within a predetermined range of a normalized time delay for a series of packets received from the beacon.

5. The method of claim 1, wherein the frame is broadcasted within 1 millisecond of the broadcast time.

6. The method of claim 1, wherein independently generating the time-window key and the temporary ID at the remote computing device further comprises: for each of a series of time windows, generating a time-window key and a temporary ID based on the respective time window; wherein the time window is within the series of time windows.

7. The method of claim 6, wherein the time parameter comprises a packet stability, wherein the packet stability is determined based on a difference between a broadcast delay and a receipt delay, wherein the broadcast delay is determined between successive broadcasting times and the receipt delay is determined between successive receipt times, wherein the user device proximity is verified in response to the packet stability for the frame falling within a predetermined range of an average packet stability for the beacon.

8. The method of claim 6, further comprising: after the time window expires, independently generating a new time-window key and a new temporary ID at the beacon for a successive time window, wherein the successive time window is within the series of time windows.

9. A method for verifying a proximity of a user device to a beacon, the method comprising:
at the beacon, near a broadcast time, broadcasting a frame comprising:
an encrypted payload, the encrypted payload comprising the broadcast time encrypted with an encryption key stored onboard the beacon; and
a temporary identifier (temporary ID), wherein the temporary ID is independently generated by both the beacon and a remote computing system based on a time associated with a time window;
at the remote computing system:
receiving the frame at a receipt time from the user device;
extracting the broadcast time from the encrypted payload based on the encryption key;
verifying the proximity of the user device to the beacon based on the extracted broadcast time and the receipt time;
extracting the temporary ID from the frame; and
determining a beacon identifier for the beacon based on the temporary ID, wherein the beacon identifier is provided to the user device, wherein the user device performs a predetermined action based on the beacon identifier.

10. The method of claim 9, wherein the temporary ID changes for each of a set of time windows, wherein each temporary ID is associated with a different encryption key, wherein the broadcast time is within a first time window of the set of time windows, the temporary ID is a first temporary ID for the first time window, and the encryption key is an encryption key associated with the first temporary ID.

11. The method of claim 10, wherein the method further comprises, for each of the set of time windows: independently generating the different encryption keys at both the beacon and the remote computing system based on a time associated with the respective time window within the set of time windows.

12. The method of claim 9, wherein the encryption key changes for each of a set of time windows, the method further comprising independently generating the encryption key at both the beacon and the remote computing system based on a time associated with the respective time window within the set of time windows.

13. The method of claim 9, wherein verifying the proximity of the user device comprises:
determining a transmission delay between the broadcast time and the receipt time; and
verifying the proximity when the transmission delay is within a predetermined range of a target delay.

14. The method of claim 13, wherein the target delay is a normalized delay over a series of frames for the beacon.

15. The method of claim 9, wherein verifying the proximity of the user device comprises:
determining a packet stability based on a difference between a broadcast delay and a receipt delay, wherein the broadcast delay is determined between successive broadcasting times and the receipt delay is determined between successive receipt times; and
verifying the proximity when the packet stability falls within a predetermined range of a target packet stability.

16. The method of claim 15, wherein the target packet stability is a normalized packet stability over a series of frames for the beacon.

17. The method of claim 9, further comprising providing a beacon identifier for the beacon to the user device, wherein the user device performs a predetermined action based on the beacon identifier.

18. The method of claim 17, wherein the beacon identifier is provided in response to the proximity verification.

19. The method of claim 17, wherein providing the beacon identifier further comprises determining the beacon identifier for the beacon based on the temporary ID, comprising, at a resolver:
for each time window of the set of time windows, retrieving a lookup table comprising a set of public identifiers, wherein each public identifier is associated with a different temporary identifier hash, wherein the temporary identifier hash for each time window is generated from a temporary identifier for the time window, wherein the temporary identifier for each time window is generated independently from the beacon;
extracting the temporary identifier from the frame; and
determining the public identifier from the set of public identifiers, wherein the public identifier is associated with the temporary identifier hash matching an analysis hash calculated from the temporary identifier extracted from the frame; wherein a predetermined action is performed based on the public identifier.

20. The method of claim 19, wherein the user device comprises the resolver, the method further comprising, at the remote computing system:
receiving a resolver geolocation from the user device;
sending the user device the lookup table, wherein the lookup table comprises a set of temporary identifier hashes for each beacon of a set of beacons associated with the resolver geolocation.

* * * * *